(12) United States Patent
Uchida et al.

(10) Patent No.: US 9,057,871 B2
(45) Date of Patent: Jun. 16, 2015

(54) SET OF COMPOUND LENSES AND IMAGING APPARATUS

(75) Inventors: Shinji Uchida, Osaka (JP); Shunsuke Yasugi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 266 days.

(21) Appl. No.: 13/808,123

(22) PCT Filed: May 14, 2012

(86) PCT No.: PCT/JP2012/003145
§ 371 (c)(1),
(2), (4) Date: Jan. 3, 2013

(87) PCT Pub. No.: WO2012/157250
PCT Pub. Date: Nov. 22, 2012

(65) Prior Publication Data
US 2013/0107104 A1 May 2, 2013

(30) Foreign Application Priority Data

May 16, 2011 (JP) ................................. 2011-109035
Oct. 31, 2011 (JP) ................................. 2011-239721

(51) Int. Cl.
*G02B 15/20* (2006.01)
*G02B 27/00* (2006.01)
(Continued)

(52) U.S. Cl.
CPC .............. *G02B 15/20* (2013.01); *G03B 13/36* (2013.01); *G02B 27/0075* (2013.01); *G02B 15/173* (2013.01); *G02B 27/0068* (2013.01); *G03B 3/10* (2013.01); *H04N 5/23212* (2013.01)

(58) Field of Classification Search
CPC .. G02B 15/20; G02B 27/0075; G02B 15/173; G02B 27/0068; G03B 3/10; G03B 13/36; H04N 5/23212
USPC .......................... 359/362, 363, 557, 823, 824; 348/208.99, 340
See application file for complete search history.

(56) References Cited

U.S. PATENT DOCUMENTS 5,124,842 A   6/1992   Honda et al.
5,148,502 A   9/1992   Tsujiuchi et al.
(Continued)

FOREIGN PATENT DOCUMENTS

DE    23 01 800    10/1974
JP    60-68312    4/1985
(Continued)

OTHER PUBLICATIONS

International Search Report issued Jul. 10, 2012 in International (PCT) Application No. PCT/JP2012/003145.
(Continued)

*Primary Examiner* — Frank Font
(74) *Attorney, Agent, or Firm* — Wenderoth, Lind & Ponack, L.L.P.

(57) ABSTRACT

A set of compound lenses according to the present invention forms, on an imaging device, an optical image of an object. The set of compound lenses includes a focus lens group including one or more lenses; a driving unit shifting a range of focus by moving the focus lens group within a predetermined range during an exposure period; and a correcting lens group correcting a shift in a position of an image formed on the imaging device to one pixel or less, the shift occurring when the focus lens group moves within the predetermined range.

13 Claims, 20 Drawing Sheets

(51) Int. Cl.
*G02B 15/173* (2006.01)
*G03B 3/10* (2006.01)
*H04N 5/232* (2006.01)
*G03B 13/36* (2006.01)

(56) References Cited

U.S. PATENT DOCUMENTS

| | | | |
|---|---|---|---|
| 5,805,347 | A | 9/1998 | Mizutani et al. |
| 5,933,513 | A | 8/1999 | Yoneyama et al. |
| 6,023,589 | A | 2/2000 | Ohta |
| 7,336,419 | B2 * | 2/2008 | Yamada et al. ............. 359/557 |
| 7,538,806 | B2 * | 5/2009 | Kawakami et al. ........... 348/251 |
| 7,711,259 | B2 | 5/2010 | Daley |
| 7,796,878 | B2 * | 9/2010 | Santo et al. ................ 396/133 |
| 8,582,205 | B2 * | 11/2013 | Hasegawa .................. 359/557 |
| 2003/0210343 | A1 * | 11/2003 | Okada ........................ 348/345 |
| 2005/0231603 | A1 * | 10/2005 | Poon ...................... 348/208.99 |
| 2006/0087561 | A1 * | 4/2006 | Kojima et al. ............ 348/208.5 |
| 2006/0140503 | A1 | 6/2006 | Kurata et al. ................ 382/275 |
| 2007/0085901 | A1 * | 4/2007 | Yang et al. ................... 348/47 |
| 2009/0195878 | A1 * | 8/2009 | Kurosawa ................... 359/557 |
| 2010/0165145 | A1 * | 7/2010 | Kuroki ....................... 348/231.2 |
| 2010/0182491 | A1 | 7/2010 | Yoshitsugu et al. |
| 2010/0225759 | A1 | 9/2010 | Mathieu |
| 2011/0019239 | A1 * | 1/2011 | Kojima et al. ............... 358/401 |

FOREIGN PATENT DOCUMENTS

| | | |
|---|---|---|
| JP | 1-309478 | 12/1989 |
| JP | 9-184978 | 7/1997 |
| JP | 9-298682 | 11/1997 |
| JP | 11-142714 | 5/1999 |
| JP | 2004-354916 | 12/2004 |
| JP | 2009-111774 | 5/2009 |
| JP | 2010-213274 | 9/2010 |
| WO | 2009/013900 | 1/2009 |

OTHER PUBLICATIONS

Hajime Nagahara et al., "Flexible Depth of Field Photography", European Conference on Computer Vision (ECCV), Oct. 2008.

Sujit Kuthirummal et al., "Flexible Depth of Field Photography", IEEE Transactions on Pattern Analysis and Machine Intelligence, vol. 33, No. 1, Jan. 2011, p. 58-71.

Edward R. Dowski, Jr. et al., "Extended depth of field through wavefront coding", Applied Optics, vol. 34, No. 11, Apr. 10, 1995, p. 1859-1866.

Anat Levin et al., "Image and Depth from a Conventional Camera with a Coded Aperture", ACM Transactions on Graphics, vol. 26, No. 3, Article 70, Jul. 2007, p. 70-1-70-9.

Christel-Loic Tisse et al., "Extended depth-of-field (EDoF) using sharpness transport across colour channels", Proceedings of SPIE, vol. 7061, Imaging in the Optical Design Process: Depth of Field, Sep. 11, 2008.

Wanli Chi et al., "Computational imaging with the logarithmic asphere: theory", Optical Society of America, vol. 20, No. 12, Dec. 2003.

Masahiro Watanabe et al., "Telecentric Optics for Focus Analysis", IEEE Transactions on Pattern Analysis and Machine Intelligence, vol. 19, No. 12, Dec. 1997.

* cited by examiner

FIG. 12

| Surface number | r | d | nd | vd |
|---|---|---|---|---|
| (Object plane) | | 1.00000 | | |
| 1 | 50.22927 | 4.487072 | 1.84666 | 23.8 |
| 2 | 35.46906 | 0.50000 | 1.49700 | 81.6 |
| 3 | -790.50069 | 2.13792 | 1.72916 | 54.7 |
| 4 | 38.06023 | Variable | | |
| 5 | 73.98907 | 2.30000 | 1.80470 | 41.0 |
| 6* | 48.21041 | 6.540698 | | |
| 7* | 7.66190 | 0.80000 | 1.77250 | 49.6 |
| 8 | -16.39518 | 0.113283 | | |
| 9 | 42.48661 | 1.830526 | 1.92286 | 20.9 |
| 10 | 24.11155 | Variable | | |
| 11 | -107.73286 | 1.20000 | | |
| 12 (Aperture) | ∞ | 2.50000 | 1.49700 | 81.6 |
| 13 | 8.84416 | 4.005193 | | |
| 14 | -1937.17088 | 3.485750 | 1.74993 | 45.4 |
| 15* | 27.97690 | 1.051116 | 1.80610 | 33.3 |
| 16 | -8.41239 | Variable | | |
| 17 | 24.75155 | 1.051329 | 1.60602 | 57.4 |
| 18* | 20.69807 | Variable | | |
| 19 | 228.24165 | 1.512066 | 1.68893 | 31.2 |
| 20* | -6.96878 | 3.500000 | 1.60602 | 57.4 |
| 21* | -33.85472 | 2.524645 | | |
| 22* | 11.71793 | 5.00000 | | |
| 23* | -16.20219 | 0.28 | | |
| 24 | ∞ | 0.4 | 1.51633 | 64.0 |
| 25 | ∞ | 0.5 | | |
| 26 | ∞ | 0.37 | 1.51633 | 64.0 |
| 27 | ∞ | | | |
| (Image plane) | | | | |

FIG. 13

(Data of aspheric lens surface)

| | k | A4 | A6 | A8 | A10 | A12 |
|---|---|---|---|---|---|---|
| 6th surface | 0.00000E+00 | 0.815460E-04 | -0.744680E-06 | 0.850858E-09 | 0.769657E-11 | |
| 7th surface | 0.00000E+00 | 0.789822E-04 | -0.102486E-05 | 0.505947E-07 | -0.175555E-08 | |
| 15th surface | 0.00000E+00 | -0.248111E-03 | -0.194659E-05 | -0.201062E-06 | 0.808408E-08 | -0.177975E-09 |
| 18th surface | 0.00000E+00 | 0.126246E-04 | -0.154509E-06 | 0.230067E-08 | 0.189234E-09 | |
| 20th surface | 0.00000E+00 | 0.183099E-02 | -0.239966E-04 | -0.129800E-05 | 0.215795E-06 | -0.861136E-08 |
| 21st surface | 0.00000E+00 | 0.475509E-03 | 0.320047E-04 | -0.537400E-05 | 0.369182E-06 | -0.964820E-08 |
| 22nd surface | 0.00000E+00 | 0.146698E-02 | 0.275059E-04 | -0.153005E-05 | | |
| 23rd surface | 0.00000E+00 | -0.815497E-03 | 0.176439E-04 | 0.103968E-05 | | |

FIG. 14

Zoom ratio 17.5

|  | Wide angle | Middle | Telephoto |
| --- | --- | --- | --- |
| Focal length | 4.95 | 18.25 | 87.00 |
| F-number | 2.8 | 2.8 | 4.6 |
| Angle of view | 32.7 | 9.6 | 2.1 |
| Image height | 3.6 | 3.6 | 3.6 |
| Lens length | 90.1 | 95.0 | 116.1 |
| d5 | 0.500 | 19.500 | 32.944 |
| d11 | 37.030 | 14.815 | 0.060 |
| d17 | 3.455 | 7.477 | 20.299 |
| d19 | 1.670 | 5.608 | 15.809 |

FIG. 15

| Surface number | r | d | nd | vd |
|---|---|---|---|---|
| (Object plane) | ∞ | | | |
| 1 | 40.67217 | 1.200 | 1.804313 | 40.87 |
| 2* | 5.75792 | 2.589 | | |
| 3 | 30.27025 | 0.80000 | 1.696802 | 55.46 |
| 4 | 8.59692 | 0.50000 | | |
| 5 | 9.68976 | 2.00000 | 1.846664 | 23.78 |
| 6 | 50.22034 | Variable | | |
| 7 (Aperture) | ∞ | 0.1 | | |
| 8* | 5.15898 | 2.000000 | 1.804313 | 40.87 |
| 9 | 5.21714 | 0.6 | | |
| 10 | 59.06628 | 1.500000 | 1.846664 | 23.78 |
| 11 | 6.57707 | 2.0 | 1.772500 | 49.62 |
| 12 | -12.78445 | Variable | | |
| 13* | 9.04199 | 1.60000 | 1.665564 | 54.76 |
| 14 | 15.76779 | Variable | | |
| 15* | -647.21129 | 0.8 | 1.846664 | 23.78 |
| 16 | 15.83842 | 1.000000 | | |
| 17 | 89.82569 | 1.050079 | 1.772500 | 49.62 |
| 18* | -9.31545 | 4.000000 | | |
| 19 | ∞ | 1.000000 | 1.516798 | 64.20 |
| (Image plane) | ∞ | | | |

FIG. 16

(Data of aspheric lens surface)

| | k | A4 | A6 | A8 | A10 |
|---|---|---|---|---|---|
| 2nd surface | -0.904028E+00 | -0.240740E-04 | -0.364742E-05 | 0.140951E-06 | -0.179198E-08 |
| 8th surface | -0.389245E+00 | -0.611466E-04 | -0.877858E-06 | 0.116669E-05 | -0.177248E-06 |
| 13th surface | 0.00000E+00 | -0.124756E-03 | 0.118009E-04 | -0.285462E-06 | -0.232431E-07 |
| 15th surface | 0.00000E+00 | 0.809917E-04 | -0.515882E-04 | 0.252514E-05 | |
| 18th surface | 0.00000E+00 | 0.794328E-03 | -0.340268E-03 | 0.115194E-05 | |

FIG. 17

Zoom ratio 3.0

|  | Wide angle | Middle | Telephoto |
|---|---|---|---|
| Focal length | 4.21 | 7.71 | 12.72 |
| F-number | 2.8 | 3.6 | 4.95 |
| Angle of view | 29.5 | 17.0 | 10.5 |
| Image height | 2.3 | 2.3 | 2.3 |
| Lens length | 45.95 | 39.37 | 39.30 |
| d6 | 25.215 | 13.237 | 6.635 |
| d12 | 2.500 | 7.791 | 12.168 |
| d18 | 1.000 | 1.100 | 3.262 |

FIG. 18

| Surface number (Object plane) | r | d | nd | vd |
|---|---|---|---|---|
| 1 | 89.8467 | 1.1500 | 1.84666 | 23.8 |
| 2 | 57.6947 | 4.2668 | 1.4970 | 81.6 |
| 3 | -10022.4053 | 0.0500 | | |
| 4 | 54.2615 | 2.5487 | 1.72916 | 54.7 |
| 5 | 131.1303 | Variable | | |
| 6* | 57.9979 | 2.6533 | 1.80470 | 41.0 |
| 7 | 9.4084 | 6.3407 | | |
| 8 | -16.0445 | 1.6913 | 1.77250 | 49.6 |
| 9 | 44.2858 | 0.1000 | | |
| 10* | 21.2275 | 3.1013 | 1.92286 | 20.9 |
| 11 | -263.2658 | Variable | | |
| 12 (Aperture) | ∞ | 1.2000 | | |
| 13 | 7.7244 | 2.0000 | 1.49700 | 81.6 |
| 14* | -345.0561 | 4.2792 | | |
| 15* | 67.7655 | 1.8129 | 1.74993 | 45.4 |
| 16 | -6.8424 | 1.0000 | 1.80610 | 33.3 |
| 17 | 42.1018 | Variable | | |
| 18* | 22.7928 | 0.9925 | 1.5310 | 55.6 |
| 19 | 86.6802 | Variable | | |
| 20 | -294.0477 | 0.8923 | 1.5310 | 55.6 |
| 21* | 12.6481 | 5.1783 | | |
| 22 | 37.7389 | 2.0000 | 1.72916 | 54.4 |
| 23* | -23.0096 | 4.7500 | | |
| 24 | ∞ | 0.28 | 1.51633 | 64.0 |
| 25 | ∞ | 0.4 | | |
| 26 | ∞ | 0.5 | 1.51633 | 64.0 |
| 27 | ∞ | 0.37 | | |
| (Image plane) | | | | |

FIG. 19

(Data of aspheric lens surface)

| | k | A4 | A6 | A8 | A10 | A12 |
|---|---|---|---|---|---|---|
| 6th surface | 0.00000E+00 | 0.438392E-04 | -0.246340E-06 | 0.138955E-08 | -0.401462E-11 | 0.550311E-14 |
| 10th surface | 0.00000E+00 | -0.494156E-04 | 0.122347E-06 | -0.972489E-09 | -0.257665E-10 | 0.229492E-12 |
| 14th surface | 0.00000E+00 | 0.360401E-04 | -0.457331E-06 | -0.252900E-07 | 0.778344E-09 | -0.159437E-10 |
| 15th surface | 0.00000E+00 | -0.348545E-03 | -0.601682E-05 | -0.183419E-06 | 0.313440E-08 | -0.272910E-09 |
| 18th surface | 0.00000E+00 | -0.781058E-05 | 0.116824E-05 | -0.417915E-07 | 0.241172E-09 | 0.202948E-11 |
| 21st surface | 0.00000E+00 | 0.120330E-04 | 0.434484E-05 | -0.142946E-06 | | |
| 23rd surface | 0.00000E+00 | 0.125986E-03 | -0.648113E-05 | 0.349451E-06 | -0.117516E-07 | |

FIG. 20

Zoom ratio 16.9

|  | Wide angle | Middle | Telephoto |
| --- | --- | --- | --- |
| Focal length | 5 | 18 | 84 |
| F-number | 2.8 | 3.4 | 4.4 |
| Angle of view | 38.39 | 11.43 | 2.54 |
| Image height | 3.88 | 3.88 | 3.88 |
| Lens length | 97.01 | 104.39 | 130.57 |
| d5 | 1.2064 | 28.5591 | 52.61 |
| d11 | 44.4909 | 16.6855 | 2.1454 |
| d17 | 3.1367 | 7.5885 | 18.39 |
| d19 | 0.5986 | 3.9766 | 9.8478 |

SET OF COMPOUND LENSES AND IMAGING APPARATUS

TECHNICAL FIELD

The present invention relates to a set of compound lenses which forms, on an imaging device, the optical image of an object, and an imaging apparatus which is equipped with the set of compound lenses.

BACKGROUND ART

Typically, there are five main techniques to achieve an extended depth of field referred to as EDOF.

The first technique employs an optical element, referred to as phase plate, inserted in the optical system in order to make blur uniform in the scene depth direction. Then, based on a previously-measured blur pattern or a simulation-calculated blur pattern, the technique executes image-restoration processing on an image obtained through the blur uniformity. Hence, the technique generates an EDOF image.

This technique is introduced as the wave-front coding, or WFC, as disclosed in Non-patent literature 1.

The second technique employs an aperture of which pattern is modified, so that the distance to the focal plane is accurately measured for each of sub-regions of the image. Then, the technique executes image-restoration processing on each sub-region, using a blur pattern which is based on each of previously-measured distances to a corresponding one of the sub-regions. Hence, the technique generates an EDOF image. This technique is introduced in Non-patent literature 2 as the coded aperture, or CA.

The third technique involves shifting a focus lens or an imaging device during the exposure time in order to convolve images which are uniformly focused in the scene depth direction. Then, based on a previously-measured blur pattern or a simulation-calculated blur pattern, the technique executes image-restoration processing on the image obtained through convolution. Hence, the technique generates an EDOF image. This technique is introduced in Non-patent literature 3 as the Flexible DOF, or F-DOF.

The fourth technique, as disclosed in Non-patent literature 4, involves estimating the depth and detecting the sharpness of the image, taking advantage of the on-axis chromatic aberration, and generating an all-focus image through image processing.

The fifth technique, as disclosed in Non-patent literature 5, involves making uniform blur in the scene depth direction using a multifocal lens, and executing image-restoration processing on the image obtained through the uniformity using a previously-measured blur pattern or a simulation-calculated blur pattern.

The F-DOF employs a lens whose light-collecting area is optimized to convolve images which are uniformly focused in the scene depth direction. Hence, in principle, the F-DOF provides excellent images. One of the largest advantages of the F-DOF is that, with the F-DOF, a high-quality image can be obtained more easily than with another technique used for obtaining an image in a less-ideal light-collecting environment created due to the inserted phase plate, the modified aperture pattern, the changed chromatic aberration, and the purposefully created blur with the multifocal lens.

However, Non-patent literature 6 shows that, as an optical condition to the F-DOF, the same object needs to be convolved on the same position of the image even though the focal point shifts during the exposure. Consequently, the F-DOF inevitably requires an additional image-side telecentric lens.

The oldest application of the above EDOF technique to industrial products is the one to the microscope.

In the case of the microscope, the technique that has long been used is to generate an EDOF image from multiple images, because a user can take time to obtain an image of a still object. The technique, however, requires much time and work as described above. Hence, along with the above technique, ideas based on the F-DOF technique have been disclosed in some references, such as Patent literatures 1 to 4. There are two disclosed techniques to employ the F-DOF for the microscope. The first technique is to move a specimen; namely the object, during the exposure, and the second technique is to move the lens barrel during the exposure.

Recently, the EDOF technique has also been applied to a camera for cellular phones. The use of the EDOF technique for the camera contributes to making the camera smaller. In other words, the EDOF effect eliminates the need of an auto-focus system for obtaining an all-focus image; that is all the objects in the image are focused.

In view of the applications of the above technique, the F-DOF itself is not adopted. This is because the F-DOF requires a mechanism to shift the focus lens or the imaging device, which makes harder to manufacture the camera smaller at a lower cost. Instead, adopted is the WFC or the technique utilizing the on-axis chromatic aberration.

Another promising application of the EDOF technique is to the one to digital still cameras.

In recent years, users have been looking for more user-friendly and further foolproof digital still cameras. The EDOF technique can meet such a request, and is promising since the technique makes it possible to obtain an all-focus image, freeing a user from obtaining an out-of-focus image.

In addition, the EDOF technique is effective when the user captures an object in a short distance, such as macro photography. For example, the EDOF technique successfully compensates a drawback that the range of focus is extremely short in the macro photography of flowers and insects. The EDOF technique can also meet the needs for a more extended depth of field.

In the above applications, the following features are required: As a basic requirement, the image should be restored in high quality; the EDOF should be large enough to obtain an all-focus image; the range of the EDOF should be able to be changed at the user's option; and, furthermore, the capturing options should be able to be easily switched between the EDOF capturing and regular image capturing so that the user can also chose the regular image capturing. The technique to satisfy all the requests among the above techniques is the F-DOF, which is very promising.

Described next are the details of the F-DOF technique.

As shown in Non-patent literature 3, the F-DOF technique involves moving the imaging device or the lens barrel in order to convolve images which are uniformly focused in the scene depth direction.

Suppose the case where the imaging device is moved to obtain the EDOF image. Here, with the lens barrel fixed to the holding stand, the imaging device is accurately moved in the direction of the optical axis of the lens barrel using the power generated by a microactuator. Such an operation changes the distance between the imaging device and the lens barrel, which makes it possible to convolve images which are uniformly focused in the scene depth direction.

CITATION LIST

Patent Literature

[PTL 1]
DE 2,301,800
[PTL 2]
Japanese Unexamined Patent Application Publication No. 60-68312
[PTL 3]
Japanese Unexamined Patent Application Publication No. 01-309478
[PTL 4]
U.S. Pat. No. 7,711,259
[PTL 5]
Japanese Unexamined Patent Application Publication No. 09-184978
[PTL 6]
WO 2009/013900
[PTL 7]
Japanese Unexamined Patent Application Publication No. 2004-354916
[PTL 8]
Japanese Unexamined Patent Application. Publication No. 11-142714

Non Patent Literature

[NPL 1]
E. R. Dowski and W. T. Cathey, "Extended depth of field through wave-front coding", Applied Optics, Vol. 34, No. 11, pp. 1859-1866 (1995).
[NPL 2]
A. Levin, R. Fergus, F. Durand and W. T. Freeman, "Image and Depth from a Conventional Camera with a Coded Aperture", ACM Transactions on Graphics, Vol. 26, No. 3, Article 70, 70-1-70-9 (2007).
[NPL 3]
H. Nagahara, S. Kuthirummal, C. Zhou and S. Nayar, "Flexible Depth of Field Photography", European Conference on Computer Vision (ECCV), October 16th, Morning Session 2: Computational Photography (2008).
[NPL 4]
C. Tisse, H. P. Nguyen, R. Tesieres, M. Pyanet and F. Guichard, "Extended Depth-of-field (EDOF) using sharpness transport across colour channels", Optical Engineering+Applications, Part of SPIE Optics+Photonics, Session 1—Imaging in the Optical Design Process: Depth of Field (2008).
[PTL 5]
W. Chi and N. George, "Computational imaging with the logarithmic asphere: theory", Optical Society of America, Vol. 20, No. 12, December (2003).
[PTL 6]
M. Watanabe and Shree K, Nayar, "Telecentric Optics for Focus Analysis", IEEE Transactions on Pattern Analysis and Machine Intelligence, Vol. 19, No. 12, December 1997.

SUMMARY OF INVENTION

Technical Problem

For the imaging apparatus that generate such a convoluted image, the users demand a smaller mechanism for shifting the focal point, and higher quality of the convoluted image.

Hence the present invention is conceived in view of the above demands and has an object to provide a set of compound lenses which includes a smaller mechanism for shifting the focal point and provides a convolved image having higher quality.

Solution to Problem

In order to achieve the above object, a set of compound lenses according to an aspect of the present invention forms, on an imaging device, an optical image of an object. The set of compound lenses includes: a focus lens unit; a driving unit which shifts a range of focus by moving the focus lens unit within a predetermined range during an exposure period; and a correcting lens unit which corrects a shift in a position of an image formed on the imaging device to one pixel or less, the shift occurring when the focus lens unit moves within the predetermined range.

Advantageous Effects of Invention

The present invention successfully implements a set of compound lenses which achieves a smaller mechanism for shifting the focal point and provides a convolved image having higher quality.

BRIEF DESCRIPTION OF DRAWINGS

FIG. 12 shows the data of surfaces of the set of compound lenses according to Embodiment 1 of the present invention.

FIG. 13 shows the data of aspherical surfaces according to Embodiment 1 of the present invention.

FIG. 14 shows various kinds of data according to Embodiment 1 of the present invention.

FIG. 15 shows the data of surfaces of the set of compound lenses according to Embodiment 2 of the present invention.

FIG. 16 shows the data of aspherical surfaces according to Embodiment 2 of the present invention.

FIG. 17 shows various kinds of data according to Embodiment 2 of the present invention.

FIG. 18 shows the data of surfaces of the set of compound lenses according to Embodiment 3 of the present invention, FIG. 19 shows the data of aspherical surfaces according to Embodiment 3 of the present invention.

FIG. 20 shows various kinds of data according to Embodiment 3 of the present invention.

DESCRIPTION OF EMBODIMENTS

Insight as Basis of Present Invention

Figure 1:
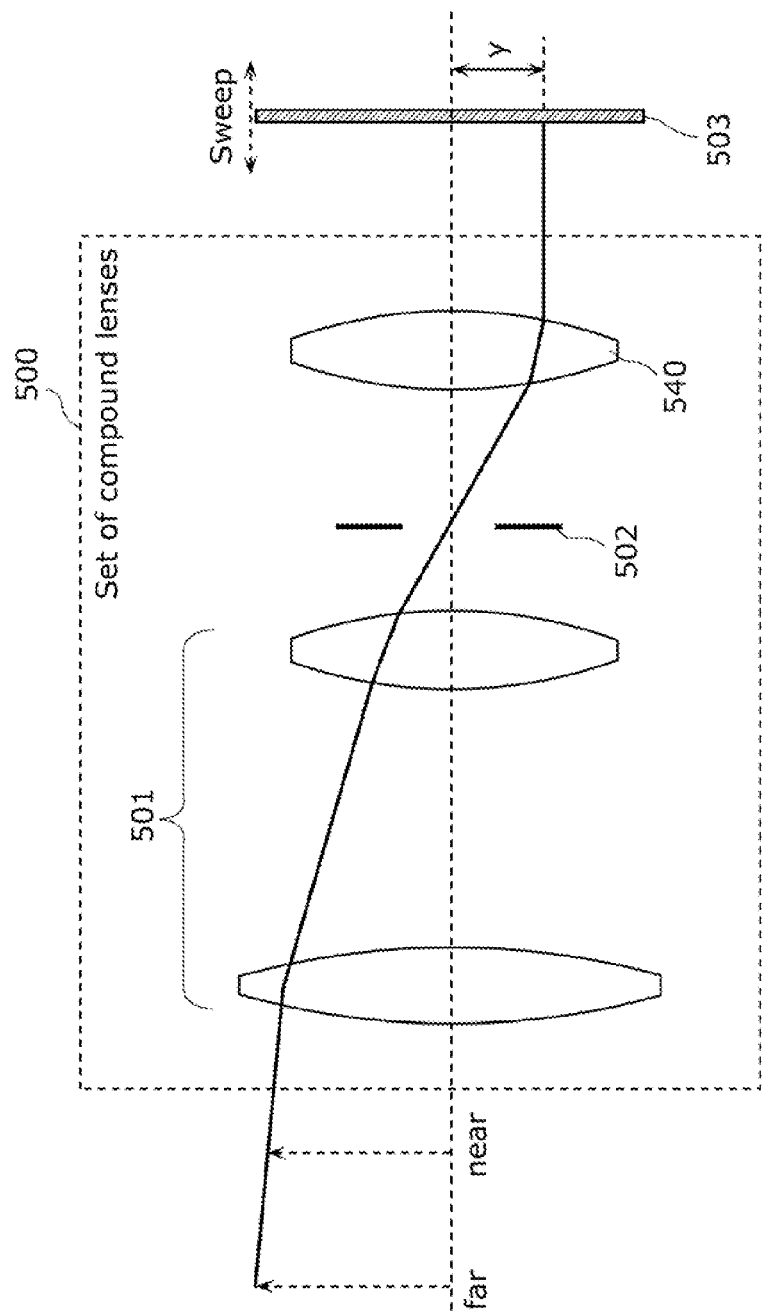
FIG. 1 shows the position of an image when the imaging device moves.

The inventors found the following problems from conventional techniques.

A typical imaging device for a digital still camera weighs between four grams and tens of grams. When the imaging device of such a weight is used for capturing a video, the imaging device should sweep as fast as 30 fps or faster. Such a sweeping motion is made by a relatively large voice coil motor, used as a driving apparatus, with a large amount of electricity supplied thereto.

Non-patent literature 3 describes the translation of the imaging device and the shift in the position of the image (hereinafter also referred to as image position) formed on the translated imaging device. In Non-patent literature 3, when the focal length is 9 mm and the object-space distance ranges between 0.2 m and 0.5 m, the imaging device is translated 259.1 µm. Here the shift in the pixel position is 7.2 pixels.

When the focal length is 12.5 mm and the object-space distance ranges between, for example, 0.5 m and infinity, the imaging device is translated 320.5 µm. When the object-space distance ranges between 0.2 m and 0.5 m, the imaging device is translated 512.8 µm. Here the shifts in the image position are 5.6 pixels and 8.5 pixels, respectively.

The shift of the image position along with the motion of the imaging device occurs when a non-telecentric optical lens is used. The non-telecentric optical lens is used for almost all of regular cameras as an optical lens. When the non-telecentric optical lens is used, the principal ray does not enter normal to the imaging device. Thus, when the imaging device moves, so does the position of a ray; namely the image position, which arrives at the imaging device during its motion.

Such a phenomenon blurs a convolved image, and significantly deteriorates the resolution of the image. Furthermore, the convolved image could be restored with a preset PSF; however, the restored image will probably be significantly deteriorated.

Moreover, Non-patent literature 6 shows how to modify an optical system into a telecentric one with an additional optical lens provided at an end of a lens. Such a structure can reduce the shift in the image position.

The telecentric optical system is larger than a conventional optical lens. Here suppose the case where the position of the imaging device is shifted from 25 mm to 27.05 mm. In the case of the conventional optical lens, the brightness of the image varies approximately as much as 6% and the image position shifts as much as 18.9 pixels. In contrast, in the case of the telecentric optical system, the brightness barely varies and the image position shifts as little as 0.1 pixels. As described above, the structure implements an excellent telecentric optical system.

The above technique; that is to place the telecentric optical system in front of the imaging device and move the imaging device, can significantly reduce the shift in the image position. Thus the technique is very effective in improving a restored image quality.

The cases mainly exemplified above are how to move the imaging device. Instead, a technique to move a lens barrel is similar to that to shift imaging device in principle. Accordingly, the effect produced with the barrel-shifting technique is similar to that produced with the imaging-device-shifting technique.

Instead of the aforementioned technique, such as moving the imaging device or the lens barrel in scene depth direction, Non-patent literature 3 also describes a technique to move a focus ring.

This technique is applied to a commercially-available digital camera. According to the technique, the user moves a focus lens group which is a part of the zoom lens system. When the user manually rotates the focus lens group at a high speed during the exposure period, the rotation convolves images which are uniformly focused in the scene depth direction.

A zoom lens optical system for a typical digital still camera is disclosed in for example, Patent literatures 6 and 7. Here, Patent literature 6 is cited as the example. In the field of the digital still camera, strongly desired cameras are the ones equipped with a zoom lens system having a high zoom ratio since these cameras are convenient. A digital camera having such a zoom lens can cover a wide range of focal length from wide angle to high telephoto angle.

For example, Patent literature 6 discloses a first lens unit having positive optical power, a second lens unit having negative optical power, a third lens unit having positive optical power, and a fourth lens unit having positive optical power. In the zoom lens optical system, all of the first to fourth lens units move along the optical axis to change the magnification. Among the lens units, the fourth lens unit is moved, so that the image is focused in with a specific zoom ratio.

Furthermore, for example, Patent literature 5 discloses a telecentric zoom lens system. In the telecentric zoom lens system, a first lens unit and a third lens unit, both having positive optical power, have a second lens unit of an a focal system provided therebetween. Among the lens units, each of (i) at least one of the first and second lens units, (i) a part of lens units included in at least one of the first lens unit and the third lens unit, and (iii) the second lens unit is to be moved independently in the optical axis direction. This feature implements the telecentric zoom lens system.

From a practical viewpoint, however, the F-DOF technique has problems described below. The F-DOF technique involves moving the imaging device. Since the imaging device weighs between four grams and tens of grams, the F-DOF technique has a problem that, in order to move the imaging device at a high speed, the technique inevitably requires a larger actuator and a larger amount of power for the larger actuator.

In addition, electrical wiring is installed to connect between a signal processing circuit for the camera and the imaging device. Hence when the imaging device moves at a high speed, the connection between the imaging device and the electrical wiring could break. Consequently, the technique develops the problem of lowering reliability of the camera.

Furthermore, with the technique that utilizes the telecentric optical system as shown in Non-patent literature 6, the quality of a convolved image would improve; however, the imaging device or the lens barrel should be moved at a high speed after all. Hence, from a practical viewpoint, the technique has significant problems to require a larger moving unit and a larger amount of power for the larger shifting unit.

In contrast, Non-patent literature 3 proposes a technique to rotate the focus ring during the exposure period. From a practical viewpoint, however, the technique has a problem that it is difficult to implement both features at once: providing a telecentric feature to an optical lens and rotating the focus ring at a high speed during the exposure period.

Based on the above problems, the inventors of the present invention conducted the overall studies of zoom lens systems which suit the F-DOF technique. As a result, the inventors have found out that an F-DOF technique which involves moving the focus lens is promising since the moving unit can be made smaller and lighter.

Furthermore, the inventors have found out that the optical lens for the F-DOF does not necessarily have to be the image-side telecentric lens that has been regarded as a norm, and that the most important point is to minimize the shift in the image position when the focus lens moves.

When the imaging device or the focus lens moves and images including a distant object and a nearby object are convolved, the telecentric optical system assures that the principal ray enters approximately normal to the image plane through the distance between the distant object and the nearby object.

FIG. 1 shows an image position in the use of a set of compound lenses 500 having a telecentric feature. The set of compound lenses 500 in FIG. 1 includes a magnification changing lens group (focal length changing lens group) 501, an aperture 502, and a focus lens group 540. The focal point shifts as an imaging device 503 moves during the exposure period. As FIG. 1 shows, in the telecentric optical system, the image position does not shift when the imaging device 503 is moved and images including a distant object and an object nearby are convolved.

Suppose such a telecentric feature is assured; however, if the principal ray for each of angles of view and the barycenter of the light-collecting area shift in an image height direction while the focus lens is moving, the resulting convolved image inevitably blurs. Consequently, the restored image is found deteriorated.

This phenomenon cannot be observed in the technique of moving the lens barrel or the imaging device. When the lens barrel or the imaging device is driven, the principal ray is set normal to the image plane. Thus the lens barrel or the imaging device simply moves straight along the optical axis, so that a blur-free and excellent image is obtained.

When the focus lens moves, however, a slight shift in the image height position will shift the image position as a result, even though the telecentric feature is assured to have the principal ray enter normal to the imaging device, is assured. Consequently, the convolved image will inevitably blur.

Figure 2:
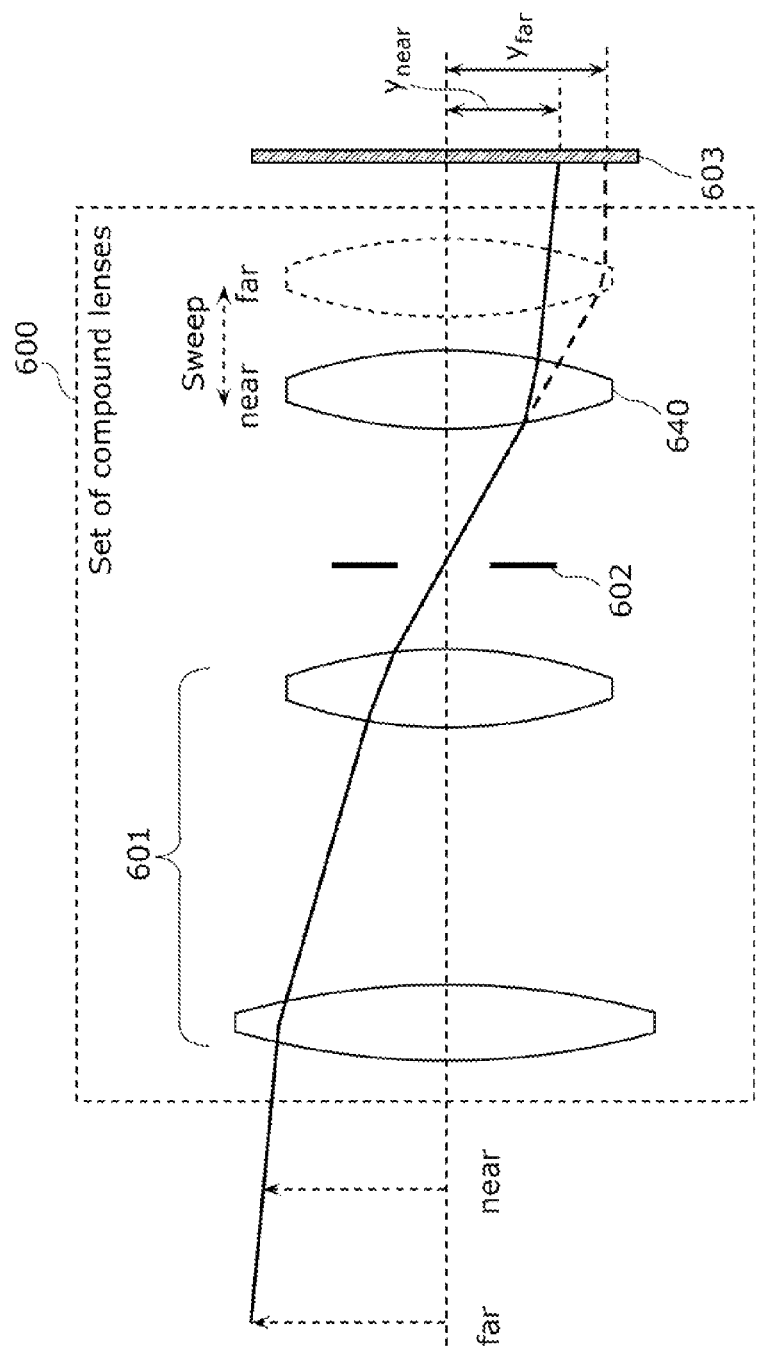
FIG. 2 shows how the position of an image shifts when the focus lens is moved.

FIG. 2 shows how the position of the image shifts when the focus lens moves. The set of compound lenses 600 in FIG. 2 includes a magnification changing lens group (focal length changing lens group) 601, an aperture 602, and a focus lens group 640. An imaging device 603 is fixed. The focal point shifts when the focus lens group 640 moves during the exposure period. As shown in FIG. 2, when the focus lens group 640 moves and images including a distant object and a nearby object are convolved, the image position shifts along with the move of the focus lens group 640.

The inventors have found out that, for freeing a convolved image from blurring to obtain an excellent restored image, the telecentric is not a requisite. Rather, even though no telecentric feature is assured, an excellent restored image can be obtained as far as the position of the principal ray or the barycenter of the light-collecting area; namely the image position, is within a range of a certain value under a predetermined condition while the focus lens is moving in a scene depth direction.

However, the telecentric feature is not assured for the optical system for a commercially available digital single-lens reflex camera. Thus the image position is assumed to change when the focus lens moves. Consequently, such a camera has a problem that a convolved image obtained with the camera blurs, and the resulting restored image will be found deteriorated.

Hence, no references have disclosed a zoom lens system which has a light-weight focus lens, and suits the F-DOF that keeps the image position from changing even though the focus lens shifts. This has been a significant problem from a practical view point.

In order to solve the above problems, a set of compound lenses according to an implementation of the present invention forms, on an imaging device, an optical image of an object. The set of compound lenses includes: a focus lens unit; a driving unit which shifts a range of focus by moving the focus lens unit within a predetermined range during an exposure period; and a correcting lens unit which corrects a shift in a position of an image formed on the imaging device to one pixel or less, the shift occurring when the focus lens unit moves within the predetermined range.

According to the above structure, the set of compound lenses according to an implementation of the present invention can shift a focal point by moving the focus lens unit. Compared with a structure for moving an imaging device, the above structure makes it possible to downsize a mechanism for shifting the focal point. Furthermore, the correcting lens unit corrects an image position shift occurred when the focus lens unit moves. Such a feature contributes to improving the image quality of a convolved image.

The position of the image formed on the imaging device may be a barycenter of a light collecting area.

Such a feature can accurately define an image position.

The barycenter of the light collecting area may be a barycenter of each of color filters formed above a light detecting unit of the imaging device.

Such a feature can accurately define an image position for each color.

The correcting lens unit ay include correcting lenses.

Such a feature allows the set of compound lenses according to an implementation of the present invention to achieve excellent optical properties. For example, the set of compound lenses can concurrently satisfy three requirements: downsizing the set of compound lenses; high MTF performance; and reduction in the shift of the image in focusing.

The correcting lens unit may be fixed.

Such a feature makes it easy to set the properties of correcting lens unit.

The focus lens unit may include only one lens.

Such a feature makes it possible to reduce the weight of the focus lens unit.

The correcting lens unit may be provided closer to the imaging device than the focus lens unit is.

The set of compound lenses may have a zoom function.

Such a structure allows a set of compound lenses having a zoom function to improve the image quality of a convolved image.

The focus lens unit may have positive optical power, and may include a focus lens which is made of plastic resin and has positive optical power, and the correcting lens unit may have positive optical power, and may include a first correcting lens which is provided nearest to an object among the one or more correcting lenses, made of plastic resin, and has negative optical power.

Such a feature makes it possible to reduce the weight of the focus lens unit. Furthermore, a set of compound lenses according to an implementation of the present invention can reduce a shift in image position caused by a change in ambient temperature when a plastic lens is in use.

The focus lens may be a positive meniscus lens.

The first correcting lens may be a negative meniscus lens.

The driving unit is a magnetodynamic actuator.

Such features allow the focus lens unit to move fast.

An imaging apparatus according to an implementation of the present invention includes the set of compound lenses and an imaging device which converts the optical image formed by the set of compound lenses into an electrical image signal.

According to the above structure, the set of compound lenses according to an implementation of the present invention can shift a focal point by moving the focus lens unit. Compared with a structure for moving an imaging device, the above structure makes it possible to downsize a mechanism for shifting the focal point. Furthermore, the correcting lens unit corrects an image position shift occurred when the focus lens unit moves. Such a feature contributes to improving the image quality of a convolved image.

It is noted that the entire part or a specific part of the implementations may be implemented in a form of or in any given combination of a system, a method, an integrated circuit, a computer program or a recording medium.

Hereinafter described are embodiments of the present invention, with reference to the drawings.

It is noted that each embodiment below is a specific example of the present invention. The numerical values, shapes, materials, constitutional elements, arrangement positions and connecting schemes of the constitutional elements, steps, and an order of steps all described in the embodiments are examples, and shall not be defined as they are. Among the constitutional elements in the embodiment, those not described in an independent claim representing the most generic concept of the present invention are introduced as arbitrary constitutional elements.

Embodiment 1

Described first is a brief overview of a set of compound lenses according to Embodiment 1.

Figure 3:
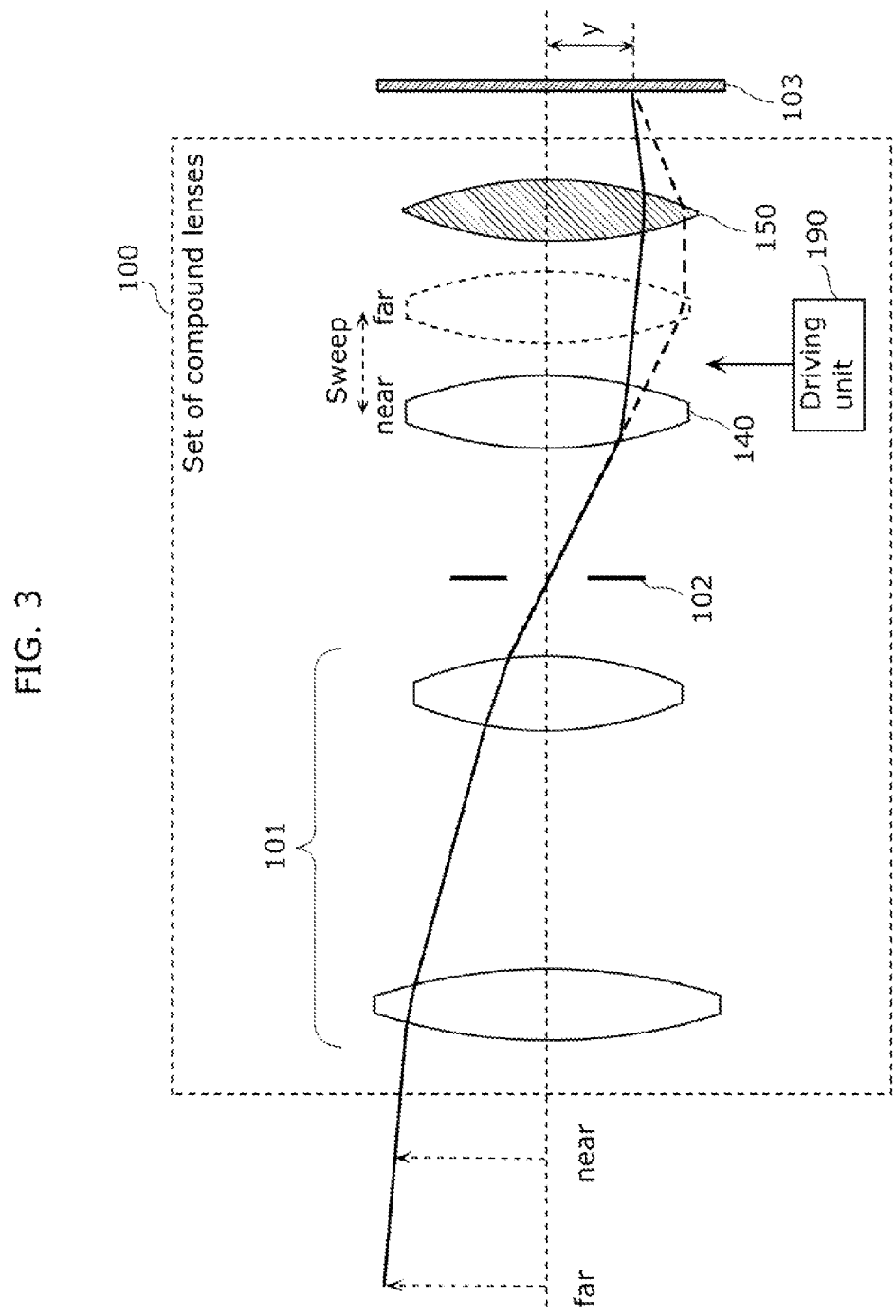
FIG. 3 shows how the position of the image shifts when a set of compound lenses according to Embodiment 1 of the present invention is used.

FIG. 3 shows the structure of a set of compound lenses 100 according to Embodiment 1 of the present invention.

The set of compound lenses 100 in FIG. 3 forms the optical image of an object on an imaging device 103. The set of compound lenses 100 includes a magnification changing lens group 101 (focal length changing lens group), an aperture 102, a focus lens group 140 (focus lens unit), a correcting lens group 150 (correcting lens unit), and a driving unit 190.

The focus lens group 140 includes one or more lenses. The driving unit 190 shifts a range of focus by moving the focus lens group 140 within a predetermined range during an exposure period. The correcting lens group 150 includes one or more lenses. The correcting lens group 150 corrects to reduce a shift in the position of an image formed on the imaging device 103 when the focus lens group 140 moves within the predetermined range. For example, the correcting lens group 150 corrects a shift in the position of an image, formed on the imaging device 103, to one pixel or less. Here the shift occurs when the focus lens group 140 moves within the predetermined range.

Figure 4:
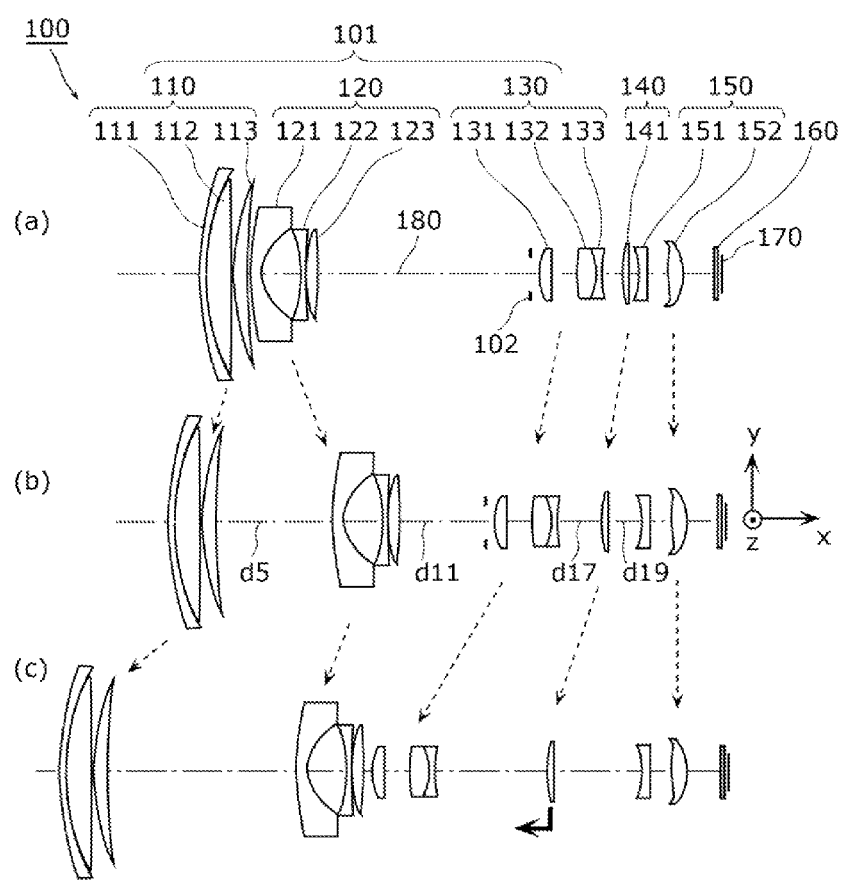
FIG. 4 shows the set of compound lenses according to Embodiment 1 of the present invention.

Described hereinafter with reference to FIG. 4 are the details of an exemplary zoom lens system used for the F-DOF of the present invention.

All the illustrations (a) to (c) in FIG. 4 show the set of compound lenses 100 which is focused with the object-space distance of 10000 mm. The illustration (a) in FIG. 4 shows the positions of the lenses for the wide-angle limit (Set to the shortest focal length: The focal length is 4.95 mm). The illustration (b) in FIG. 4 shows the positions of the lenses for a middle position (Set to the middle focal length: The focal length is 18 mm). The illustration (c) in FIG. 4 shows the positions of the lenses for the telephoto limit (Set to the farthest focal length: The focal length is 87 mm).

Each of the dashed arrows between the illustrations (a) and (b) in FIG. 4 shows a line connecting positions of a lens group for the wide-angle limit and the middle position. Similarly, each of the dashed arrows between the illustrations (b) and (c) in FIG. 4 shows a line which connects positions of a lens group for the middle position and the telephoto limit.

Hence, in FIG. 4, the illustrations for the wide-angle limit and the middle position are simply connected by straight lines, and the illustrations for the middle position and the telephoto limit are also simply connected by straight lines. Actual motions of each of the lens groups may be different from what the straight lines show.

Moreover, the solid arrow in the illustration (c) in FIG. 4 shows that the focus lens group 140 is changing its focusing state from the state where the object-space distance of 10000 mm to the state where an object nearby is focused on. In other words, the solid arrow shows the direction in which the focus lens group 140 moves while the focusing state is changing from the state where the object-space distance is 10000 mm to the state where an object nearby is focused on.

The set of compound lenses 100 in FIG. 4 has a zoom function. In an order of the object side to the image side (positive direction in the x-axis), the set of compound lenses 100 includes a first lens group 110 which has positive optical power, a second lens group 120 which has negative optical power, a third lens group 130 which has positive optical power, the focus lens group 140 which has positive optical power, and the correcting lens group 150 which has positive optical power.

It is noted that, in FIG. 4, the positive direction and the negative direction in the x-axis are respectively referred to as the image side and the object side. Moreover, the first lens group 110, the second lens group 120, and the third lens group 130 correspond to the magnification changing lens group 101 shown in FIG. 3.

In zooming from the wide-angle limit to the telephoto limit, all the first lens group 110, the second lens group 120, the third lens group 130, and the focus lens group 140 move along an optical axis 180. The correcting lens group 150 is fixed.

The set of compound lenses 100 according to Embodiment 1 has each of the lens groups aligned so that desired optical power is obtained, and successfully achieves a zoom ratio of over 16×. Furthermore, the set of compound lenses 100 causes little image position shift which develops when the focus lens group 140 moves. Moreover, the set of compound lenses 100 achieves the downsizing of the lens system as a whole, as well as keeps high optical performance.

It is noted that, in FIG. 4, the straight line on the far right shows the position of an image plane 170. A parallel plate 160 which is equivalent to the faceplate for an imaging device or an optical low-pass filter is provided on the object side (between the image plane 170 and the surface of the far image-side lens in the correcting lens group 150) of the image plane 170. Furthermore, in FIG. 4, the aperture 102 is provided between the surface of the far image-side lens in the second lens group 120 and the surface of the far object-side lens in the third lens group 130.

As shown in the set of compound lenses 100 according to Embodiment 1 in FIG. 4, the first lens group 110 includes the following lens elements in an order of the object side to the image side: a first lens element 111 which is formed in a negative meniscus that is convex to the object side, a second lens element 112 which is formed in a biconvex shape, and a third lens element 113 which is formed in a positive meniscus that is convex to the object side. The first lens element 111 and the second lens element 112 are cemented together.

In an order of the object side to the image side, the second lens group 120 includes a fourth lens element 121 which is formed in a negative meniscus that is convex to the object side, a fifth lens element 122 which is formed in a biconvex shape, and the sixth lens element 123 which is formed in a biconvex shape.

Furthermore, in an order of the object side to the image side, the third lens group 130 includes a seventh lens element 131 which is formed in a biconvex shape, an eighth lens element 132 which is formed in a biconvex shape, and a ninth lens element 133 which is formed in a biconcave shape. The eighth lens element 132 and the ninth lens element 133 are cemented together.

The focus lens group 140 includes a focus lens 141 (tenth lens element) which is formed in a positive meniscus that is convex to the object side.

In an order of the object side to the image side, the correcting lens group 150 includes a first correcting lens 151 (eleventh lens element) formed in a positive meniscus that is concave from the object side, and a second correcting lens 152 (twelfth lens element) which has (i) a surface facing the object side and shaped convex in center and concave on periphery and (ii) another surface which is convex to the image side.

It is noted that, in the set of compound lenses 100 according to Embodiment 1, the parallel plate 160 is provided on the object side of the image plane 170 (between the image plane 170 and the second correcting lens 152).

In zooming from the wide-angle limit to the telephoto limit, the first lens group 110, the third lens group 130, and the focus lens group 140 move toward the object side, and the second lens group 120 shuttles once between the image side and the object side. In other words, the second lens group 120 once moves toward the image side, and then moves toward the object side.

In zooming from the wide-angle limit to the telephoto limit, all the first lens group 110, the second lens group 120, the third lens group 130, and the focus lens group 140 move along the optical axis 180. It is noted that, among the lens groups, the third lens group 130 may be moved normal to the optical axis 180. This shift makes it possible to optically correct the motion blur of an image, such as camera shake and vibration.

Embodiment 1 has shown an exemplary case where the correcting lens group 150 is fixed; however, the structure of the present invention shall not be defined as it is. Similar to the other lens groups, the entire correcting lens group 150 or some of the lenses in the correcting lens group 150 may be moved in zooming.

Embodiment 1 has described the specific shapes of the lens elements included in each of the lens groups; however, the structure of each of the lens groups and the shape of each lens element shall not necessarily be defined as they are. The structure of each of the groups of the lenses and the shape of each lens may be optimized based on desired specifications.

Here the number of the lenses included in the correcting lens group 150 is very important in reducing a shift in the position of the image. A study by the inventors shows that having two lenses in the correcting lens group 150 is much more effective than having one lens in order to concurrently satisfy three requirements: downsizing the set of compound lenses; high modulation transfer function (MTF) performance; and reduction in the shift of the image in focusing. In other words, two correcting lenses (the first correcting lens 151 and the second correcting lens 152) provided between the focus lens group 140 and the imaging device (the image plane 170) achieve excellent optical properties.

Figure 5A:
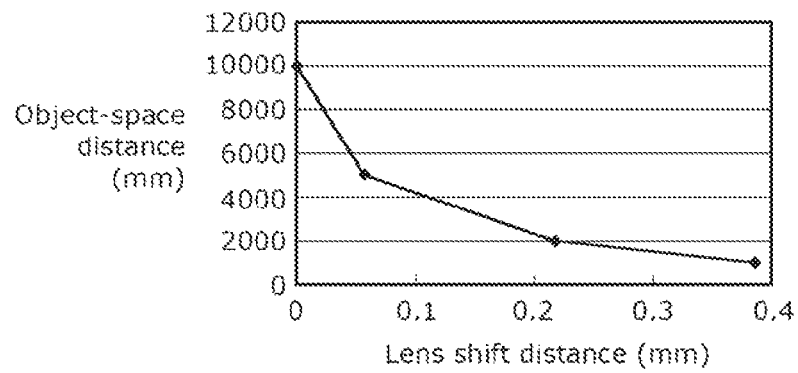
FIG. 5A shows the optical properties of the set of compound lenses according to Embodiment 1 of the present invention.
Figure 5B:
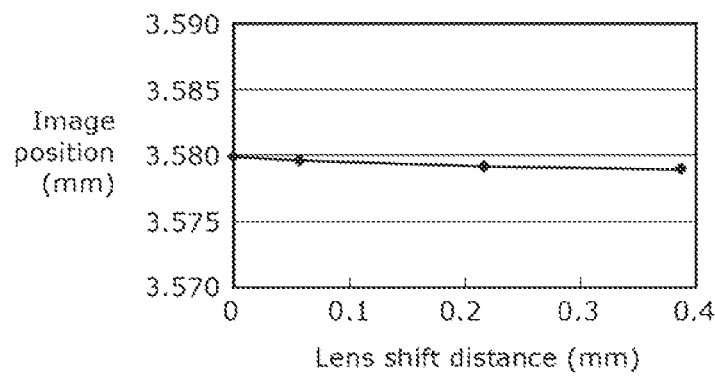
FIG. 5B shows the optical properties of the set of compound lenses according to Embodiment 1 of the present invention.
Figure 5C:
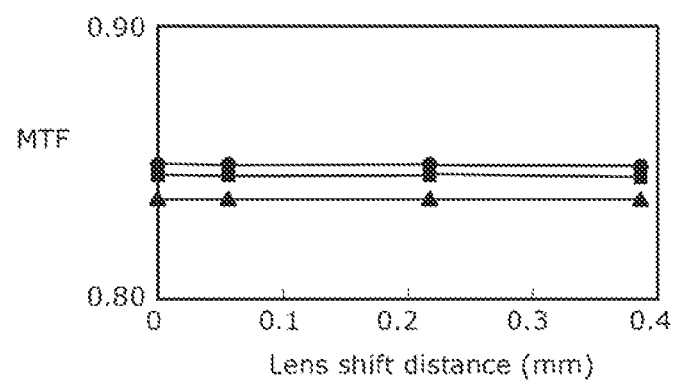
FIG. 5C shows the optical properties of the set of compound lenses according to Embodiment 1 of the present invention.

FIGS. 5A to 5C show optical properties obtained by the set of compound lenses 100 according to Embodiment 1. FIG. 5A shows a relationship between an object-space distance and a lens shift distance.

Here the lens shift distance indicates how far a focus lens 141 moves when the object-space distance changes, based on the position of the focus lens 141 in the focus lens group 140 that is in a standard state. In the standard state, the positions of the first lens group 110, the second lens group 120, the third lens group 130, and the focus lens group 140 are set so that, in the set of compound lenses 100 shown in FIG. 4, the image of an object is formed on the image plane 170 with a desired focal length and an object-space distance of 10000 mm.

FIG. 5A depicts a graph with the plotted lens shift distances of the focus lens 141 in the illustration (c) in FIG. 4 when the focal length is 18.25 mm and the object-space distance changes from 10000 mm to 5000 mm, to 2000 mm, and to 1000 mm. In the graph, the plotted points are connected with straight lines for the sake of convenience. As a matter of course, the actual properties are to be shown in a curve.

As the graph shows, the lens shift distance is greater as the object comes closer to the set of compound lenses 100.

FIG. 5B shows how the image position shifts in association with the shift of the focus lens 141. As an example, FIG. 5B shows the shift when the angle of view is the outer-most one—that is 9.5°. As seen in the graph, the shift in the image position is found so small that the shift distance of the image position is decreased as short as 1 μm or shorter.

Here the image position is defined by, for example, the position of the principal ray. This technique is effective when, out of the aberration of the set of compound lenses 100, the amount of spherical aberration is dominant and coma aberration is small. In such a case, the technique makes the designing of a lens easy.

In addition, defining the barycenter of a light-collecting area is effective in accurately defining the image position. This technique makes it possible to obtain a convolved image having little blur even though the coma aberration is dominant on a set of compound lenses.

Described next are MTF characteristics with reference to FIG. 5C. As shown in FIG. 5C, the MTF rarely deteriorates even though the shift distance of the focus lens 141 greatly changes from 0 mm to 0.38 mm.

Furthermore, FIG. 5C shows MFT performance at 50 lp/mm. The circles in the graph show the on-axis MTF performance. The squares in the graph show the MTF performance in a saggital direction (radiation direction) when the image height is seventy percent. The triangles in the graph show the MTF performance in a tangential direction (circumferential direction) when the image height is seventy percent.

According to FIGS. 5B and 5C, the set of compound lenses 100 shows little shift in the image position when the focus lens 141 shifts, and maintains excellent MTF performance. It is noted that FIGS. 5A to 5C show an exemplary focal length of 18.25 mm. When the focal lengths are 87 mm and 4.95 mm, the set of compound lenses 100 still maintains high performance. Hence, even a high-performance zoom lens having the zoom ratio of over 16× and the angle of view of over 32° can implement significantly excellent optical properties, when used as a small zoom lens for the F-DOF in a wide range from the wide-angle limit to the telephoto omit.

Embodiment 2

Embodiment 2 of the present invention describes a modification of the set of compound lenses 100 according to Embodiment 1. Embodiment 1 specifically exemplifies the case of three lens groups used as the magnification changing lens group 101. Embodiment 2 exemplifies the case of two lens groups used as the magnification changing lens group 101.

Figure 6:
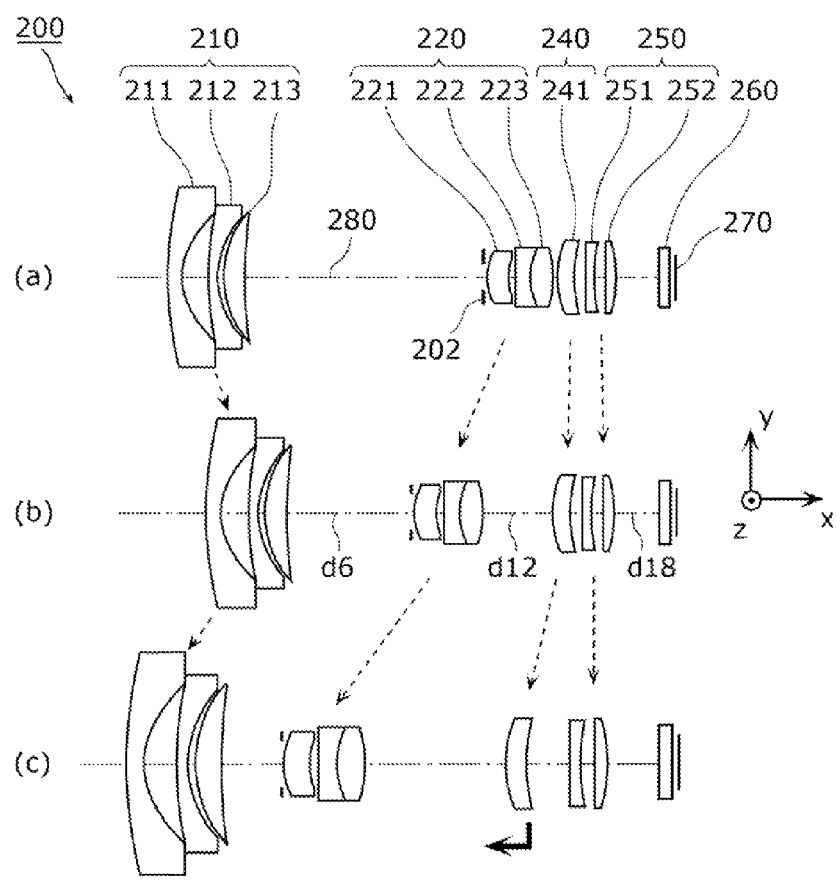
FIG. 6 shows a set of compound lenses according to Embodiment 2 of the present invention.

FIG. 6 shows an exemplary zoom lens to be used for the F-DOF according to Embodiment 2 of the present invention.

All the illustrations (a) to (c) in FIG. 6 show a set of compound lenses 200 which is focused with the object-space distance of 10000 mm. The illustration (a) in FIG. 6 shows the positions of the lenses for the wide-angle limit (Set to the shortest focal length: The focal length is 4.2 mm). The illustration (b) in FIG. 6 shows the positions of the lenses for a middle position (Set to the middle focal length: The focal length is 7.7 mm). The illustration (c) in FIG. 6 shows the positions of the lenses for the telephoto limit (Set to the farthest focal length: The focal length is 12.7 mm).

Each of the dashed arrows between the illustrations (a) and (b) in FIG. 6 shows a line connecting positions of a lens group for the wide-angle limit and the middle position. Similarly, each of the dashed arrows between the illustrations (b) and (c) in FIG. 6 shows a line connecting positions of a lens group for the middle position and the telephoto limit. Hence, in FIG. 6, the illustrations for the wide-angle limit and the middle position are simply connected by straight lines, and the illustrations for the middle position and the telephoto limit are also simply connected by straight lines. Actual motions of each of the lens groups may be different from what the straight lines show.

Moreover, the solid arrow in the illustration (c) in FIG. 6 shows that a focus lens group 240 is changing its focusing state from the state where the object-space distance of 10000 mm to the state where an object nearby is focused on. In other words, the solid arrow shows the direction in which the focus lens group 240 moves while the focusing state is changing from the state where the object-space distance is 10000 mm to the state where an object nearby is focused on.

In an order of the object side to the image side, the set of compound lenses 200 in FIG. 6 includes a first lens group 210 which has negative optical power, a second lens group 220 which has positive optical power, the focus lens group 240 (focus lens unit) having positive optical power, and a correcting lens group 250 (correcting lens unit) which has positive optical power.

In zooming from the wide-angle limit to the telephoto limit, all the first lens group 210, the second lens group 220, and the focus lens group 240 move along an optical axis 280. The correcting lens group 250 is fixed.

The set of compound lenses 200 according to Embodiment 2 has each of the lens groups aligned so that desired optical power is obtained, and successfully achieves a zoom ratio of approximately 3×, Furthermore, the set of compound lenses 200 causes little image position shift which develops when the focus lens group 240 moves. Moreover, the set of compound lenses 200 achieves the downsizing of the lens system as a whole, as well as keeps high optical performance.

It is noted that, in FIG. 6, the straight line on the far right shows the position of an image plane 270. A parallel plate 260 which is equivalent to the faceplate for an imaging device or an optical low-pass filter is provided on the object side (between the image plane 270 and the surface of the far image-side lens in the correcting lens group 250) of the image plane 270. Furthermore, in FIG. 6, an aperture 202 is provided between the surface of the far image-side lens in the first lens group 210 and the surface of the far object-side lens in the second lens group 220.

As shown in the set of compound lenses 200 according to Embodiment 2 in FIG. 6, the first lens group 210 includes the following lens elements in an order of the object side to the image side: a first lens element 211 which is formed in a negative meniscus that is convex to the object side, a second lens element 212 which is formed in a negative meniscus that is convex to the object side, and a third lens element 213 which is formed in a positive meniscus that is convex to the object side.

In an order of the object side to the image side, the second lens group 220 includes a fourth lens element 221 which is formed in a positive meniscus that is convex to the object side, a fifth lens element 222 which is formed in a negative meniscus that is convex to the object side, and a sixth lens element 223 which is formed in a biconvex shape. The fifth lens element 222 and the sixth lens element 223 are cemented together.

The focus lens group 240 includes a focus lens 241 (seventh lens element) which is formed in a positive meniscus that is convex to the object side.

In an order of the object side to the image side, the correcting lens group 250 includes a first correcting lens 251 (eighth lens element) and a second correcting lens 252 (ninth lens element) which is formed in a biconvex shape.

It is noted that, in the set of compound lenses 200 according to Embodiment 2, the parallel plate 260 is provided on the object side of the image plane 270 (between the image plane 270 and the second correcting lens 252).

In zooming from the wide-angle limit to the telephoto limit, the first lens group 210 shuttles once between the image side and the object side. In other words, the first lens group 210 once moves toward the image side, and then moves toward the object side. The second lens group 220 and the focus lens group 240 moves toward the object side, and the correction lens group 250 does not move.

Embodiment 2 has shown an exemplary case where the correcting lens group 250 is fixed; however, the structure of the present invention shall not be defined as it is. Similar to the other lens groups, the correcting lens group 250 as a whole or some of the lenses in the correcting lens group 250 may be moved in zooming.

Embodiment 2 has described the specific shapes of the lens elements included in each of the lens groups; however, the structure of each of the lens groups and the shape of each lens element do not have to be defined as they are. The structure of each of the lens groups and the shape of each lens may be optimized based on desired specifications.

Here, similar to Embodiment 1, the number of the lenses included in the correcting lens group 250 is very important in reducing a shift in the position of the image.

A study by the inventors shows that having two lenses in the correcting lens group 250 is much more effective than having one lens in order to concurrently satisfy three requirements: a smaller set of compound lenses 200; high modulation transfer function (MTF) performance; and reduction in the shift of the image in focusing. In other words, two correcting lenses (the first correcting lens 251 and the second correcting lens 252) provided between the focus lens group 240 and the imaging device (the image plane 270) achieve excellent optical properties.

Hence, at least two lenses provided between the focus lens group 240 and the imaging device are effective in substantially reducing the shift in the image position when the focus lens group 240 moves, as well as in maintaining high MTF.

Furthermore, a study shows, though not described in Embodiment 2, that, for a fixed-focus optical system whose focal length is invariable, two lenses provided between the focus lens and the imaging device provide excellent optical properties similar to the ones for the sets of compound lenses 100 and 200 in Embodiments 1 and 2.

In other words, regardless of the number of lenses included in the set of compound lenses, the arrangement of the lenses, and the number of the lens groups, the two lenses provided between the focus lens and the imaging device are very effective for a set of compound lenses included in an F-DOF-based imaging apparatus.

In other words, the above has shown an exemplary case where the present invention is applied to a zoom lens system; instead, the present invention can also be applied to a set of compound lenses for a fixed-focus optical system having no zooming capability. In other words, the set of compound lenses according to the present invention may include the above focus lens groups and correction lens group. It is noted that the set of compound lenses may include at least one lens to be provided on the object side of the focus lens group.

Figure 7A:
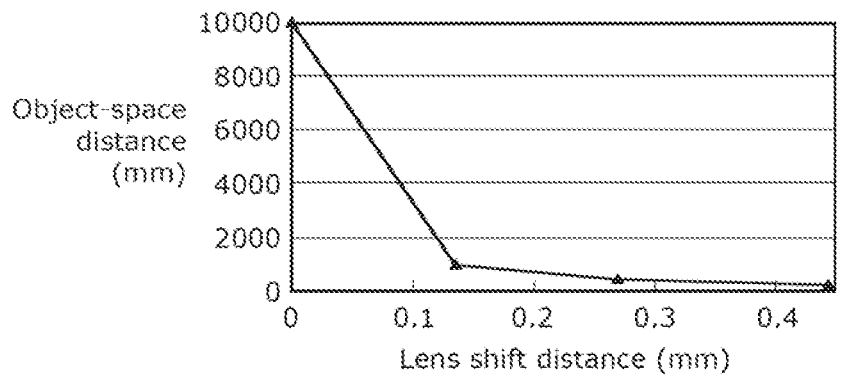
FIG. 7A shows the optical properties of the set of compound lenses according to Embodiment 2 of the present invention.
Figure 7B:
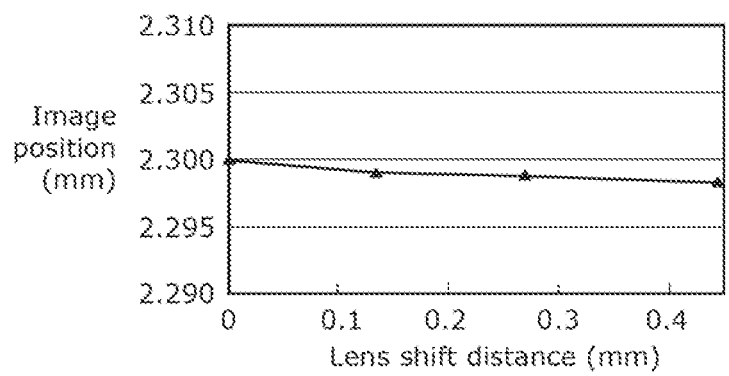
FIG. 7B shows the optical properties of the set of compound lenses according to Embodiment 2 of the present invention.
Figure 7C:
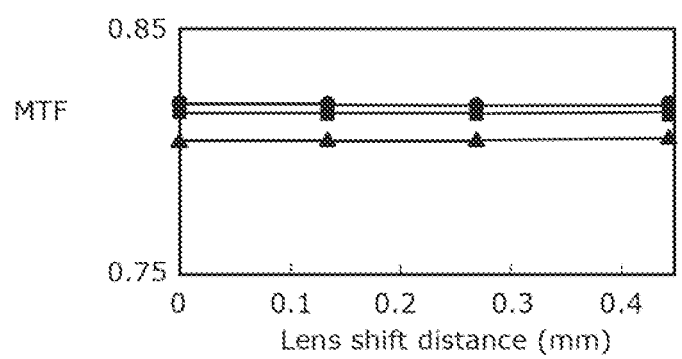
FIG. 7C shows the optical properties of the set of compound lenses according to Embodiment 2 of the present invention.

FIGS. 7A to 7C show optical properties obtained by the set of compound lenses 200 according to Embodiment 2.

FIG. 7A shows a relationship between an object-space distance and a lens shift distance.

Here the lens shift distance indicates how far a focus lens 241 moves when the object-space distance changes, based on the position of the focus lens 241 in the focus lens group 240 that is in a standard state. In the standard state, the positions of the first lens group 210, the second lens group 220, and the focus lens group 240 are set so that, in the set of compound lenses 200 shown in FIG. 6, the image of an object is formed on the image plane 270 with a desired focal length and an object-space distance of infinity.

FIG. 7A depicts a graph with the plotted lens shift distances of the focus lens 241 in the illustration (c) in FIG. 6 when the focal length is 12.7 mm and the object-space distance changes from 1000 mm to 500 mm, and to 300 mm. In the graph, the plotted points are connected with straight lines for the sake of convenience. As a matter of course, the actual properties are to be shown in a curve.

As the graph shows, the lens shift distance is greater as the object comes closer to the set of compound lenses 200.

FIG. 7B shows how the image position shifts in association with the shift of the focus lens 241. As an example, FIG. 7B shows the shift when the focal length is 12.7 mm and the angle of view is the widest—that is 105°.

Despite the shift of the focus lens, FIG. 7A to 7C show that the image position shift is successfully diminished to extremely short one—that is as short as approximately 1.8 μm or shorter.

Here the image position is defined by, for example, the position of the principal ray as described in Embodiment 1. This technique is effective when, out of the aberration of the set of compound lenses 200, the amount of spherical aberration is dominant and coma aberration is small. In such a case, the technique makes the designing of a lens easy.

In addition, defining the barycenter of a light-collecting area is effective in accurately defining the image position. This technique makes it possible to obtain a convolved image having little blur even though the coma aberration is dominant in a set of compound lenses.

FIG. 7C shows MTF performance when the focus lens 241 shifts. As shown in FIG. 7C, the MTF rarely deteriorates even though the shift distance of the focus lens 241 greatly changes from 0 mm to 0.4447 mm.

Furthermore, FIG. 7C shows MFT performance at 50 lp/mm. The circles in the graph show the on-axis MTF performance. The squares in the graph show the MTF performance in a saggital direction (radiation direction) when the image height is seventy percent. The triangles in the graph show the MTF performance in a tangential direction (circumferential direction) when the image height is seventy percent.

According to FIGS. 7A to 7C, the set of compound lenses 200 shows little shift in the image position when the focus lens 241 shifts, and maintains excellent MTF performance. It is noted that FIGS. 7A to 7C show an exemplary focal length of 12.7 mm. When the focal lengths are 4.21 mm and 7.71 mm, the set of compound lenses 200 still maintains high performance. Hence, even a zoom lens having independently-moving three lens group can implement significantly excellent optical properties, when used as a small zoom lens for the F-DOF in a wide range from the wide-angle limit to the telephoto limit.

Embodiment 3

Embodiment describes a case where a plastic lens is used as a focus lens.

There are exemplary techniques to improve zoom lens systems for digital still cameras. Among such techniques, Patent literature 8 discloses how to reduce the weight of a lens element itself. Patent literature 8 discloses a zoom lens system which employs a plastic lens.

As Patent literature 8 discloses, plastic lenses are used for a variety of devices, such as finder systems, infra-red active auto focus units, and some of imaging optical systems. The plastic lens is superior to the glass lens in terms of freer shaping and higher cost benefit.

Furthermore, when the focus lens continuously shuttles at a high speed as seen in the F-DOF, the glass lens causes a problem of generating vibration and noise.

In order to reduce the weight of the focus lens, the use of the plastic lens is considered instead of the glass lens.

For example, a typical glass material which relatively weighs light; namely the BSC7 (Registered), has the specific gravity of 2.52. In comparison, an exemplary plastic material; namely E48R (Registered) has the specific gravity of approximately 1.01. Hence, the use of the plastic lens instead of the glass lens can easily reduce the lens weight in approximately half.

As shown in Patent literature 8, however, the use of a plastic material as the material of a lens causes a change in the refractive index of the plastic material along when the ambient temperature changes. The resulting and known problem is a shift in the focal point, which makes the photo out of focus.

This is because the change in the refractive index of the plastic material is significantly greater than that of the glass material.

For example, the plastic material E48R has the temperature change coefficient of the refractive index of approximately $dn/dT=-92\times10^{-6}/C$. The glass material BKSC7 has the temperature change coefficient of approximately $2.6\times10^{6}/C$. Hence, the plastic material has a temperature change coefficient which is as great as one digit or greater than that of the glass material.

Thus Patent literature 8 discloses the use of a temperature sensor. Based on a measurement obtained by the temperature sensor, the position where the focus lens moves is calculated for correcting the focal point.

The additional temperature sensor, however, inevitably results in an increase in the cost of an imaging apparatus. Thus a desired imaging apparatus will be less affected to a change in ambient temperature without the temperature sensor.

If the shift of the focal point caused by a change in ambient temperature is small in an optical system, the optical system can take advantage of the temperature sensor to obtain a less out-of-focus image. It is such an optical system that has been desired.

Figure 8:
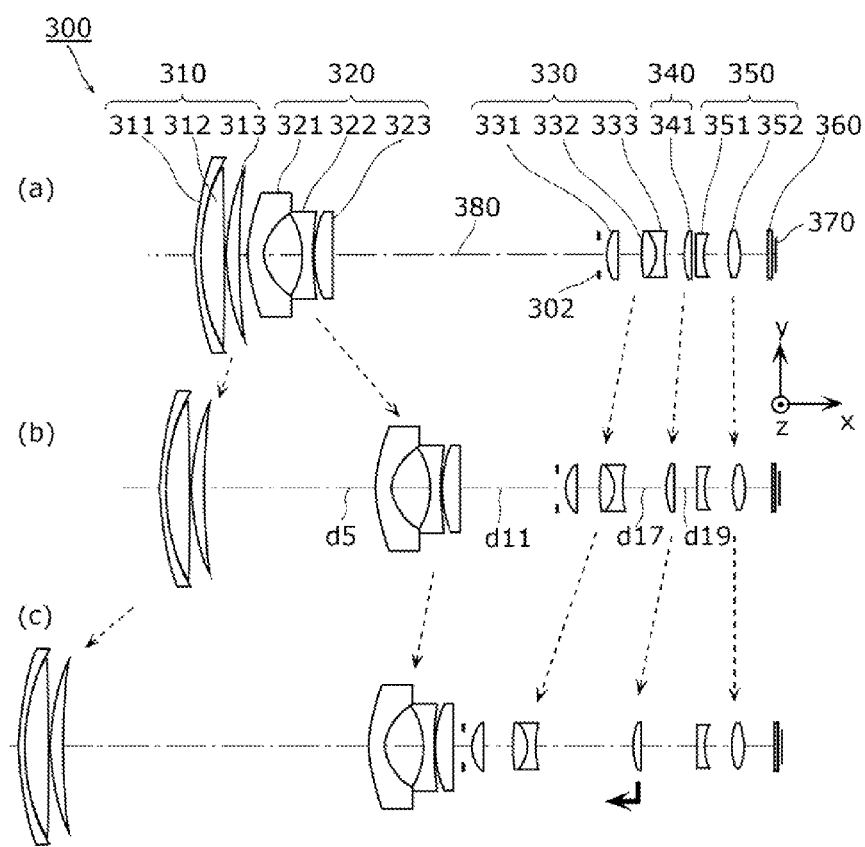
FIG. 8 shows a set of compound lenses according to Embodiment 3 of the present invention.

Described hereinafter with reference to FIG. 8 is an exemplary zoom lens system used for the F-DOF according to Embodiment 3.

The illustrations (a) to (c) in FIG. 8 show the set of compound lenses 300 which is focused with the object-space distance of infinite. The illustration (a) in FIG. 8 shows the positions of the lenses for the wide-angle limit (Set to the shortest focal length: The focal length is 5 mm). The illustration (b) in FIG. 8 shows the positions of the lenses for a middle position (Set to the middle focal length: The focal length is 18 mm). The illustration (c) in FIG. 8 shows the positions of the lenses for the telephoto limit (Set to the farthest focal length: The focal length is 84 mm).

Each of the dashed arrows between the illustrations (a) and (b) in FIG. 8 shows a line connecting positions of a lens group for the wide-angle limit and the middle position. Each of the dashed arrows between the illustrations (b) and (c) in FIG. 8 shows a line which connects positions of a lens group for the middle position and the telephoto limit.

Hence, in FIG. 8, the illustrations for the wide-angle limit and the middle position are simply connected with straight lines, and the illustrations for the middle position and the telephoto limit are also simply connected with straight lines. Actual motions of each of the lens groups may be different from what the straight lines show.

Moreover, the solid arrow in the illustration (c) in FIG. 8 shows the moving direction of a focus lens group 340 while the focus lens group 340 is changing its focusing state from the state where the object-space distance of infinite to the state where an object nearby is focused on.

A set of compound lenses 300 includes the following lens units in an order of the object side to the image side: a first lens group 310 which has positive optical power, a second lens group 320 which has negative optical power, a third lens group 330 which has positive optical power, a focus lens group 340 (focus lens unit) which has positive optical power, and a correcting lens group 350 (correcting lens unit) which has positive optical power.

In zooming from the wide-angle limit to the telephoto limit, all the first lens group 310, the second lens group 320, the third lens group 330, and the focus lens group 340 move along an optical axis 380. The correcting lens group 350 is fixed.

The set of compound lenses 300 according to Embodiment 3 has each of the lens groups aligned so that desired optical power is obtained, and successfully achieves a zoom ratio of over 16×. Furthermore the set of compound lenses 300 causes little image position shift which develops when the focus lens group 340 moves. Moreover the set of compound lenses 300 achieves the downsizing of the lens system as a whole, as well as keeps high optical performance.

It is noted that, in FIG. 8, the straight line on the far right shows the position of an image plane 370. A parallel plate 360 which is equivalent to the faceplate for an imaging device or an optical low-pass filter is provided on the object side (between the image plane 370 and the surface of the far image-side lens in the correcting lens group 350) of the image plane 370.

Furthermore, in FIG. 8, an aperture 302 is provided between the surface of the far image-side lens in the second lens group 320 and the surface of the far object-side lens in the third lens group 330.

As shown in the set of compound lenses 300 according to Embodiment 3 in FIG. 8, the first lens group 310 includes the following lens elements in an order of the object side to the image side: a first lens element 311 which is formed in a negative meniscus that is convex to the object side, a second lens element 312 which is formed in a biconvex shape, and a third lens element 313 which is formed in a positive meniscus that is convex to the object side. The first lens element 311 and the second lens element 312 are cemented together.

In an order of the object side to the image side, the second lens group 320 includes a fourth lens element 321 which is formed in a negative meniscus that is convex to the object side, a fifth lens element 322 which is formed in a biconvex shape, and a sixth lens element 323 which is formed in a biconvex shape.

Furthermore, in an order of the object side to the image side, the third lens group 330 includes a seventh lens element 331 which is formed in a positive meniscus that is convex to the object side, an eighth lens element 332 which is formed in a biconvex shape, and a ninth lens element 333 which is formed in a biconcave shape. The eighth lens element 332 and the ninth lens element 333 are cemented together.

The focus lens group 340 includes a focus lens 341 (tenth lens element) which is formed in a positive meniscus that is convex to the object side.

In an order of the object side to the image side, the correcting lens group 350 includes a first correcting lens 351 (eleventh lens element) which is formed in a biconcave shape and a second correcting lens 352 (twelfth lens element) which is formed in a biconvex shape.

It is noted that, in the set of compound lenses 300 according to Embodiment 3, the parallel plate 360 is provided on the object side of the image plane 370 (between the image plane 370 and the second correcting lens 352).

In zooming from the wide-angle limit to the telephoto limit, the first lens group 310, the third lens group 330, and the focus lens group 340 move toward the object side, and the second lens group 320 shuttles between the image side and the object side. In other words, the second lens group 320 once moves toward the image side, and then moves toward the object side.

In zooming from the wide-angle limit to the telephoto limit, all the first lens group 310, the second lens group 320, the third lens group 330, and the focus lens group 340 move along the optical axis 380.

It is noted that, among the lens groups, the third lens group 330 may be moved normal to the optical axis 380. This shift makes it possible to optically correct the motion blur of an image.

Embodiment 3 has shown an exemplary case where the correcting lens group 350 is fixed; however, the structure of the present invention shall not be defined as it is Similar to the other lens groups, the entire correcting lens group 350 or some of the lenses in the correcting lens group 350 may be moved in zooming.

Embodiment 3 has described the specific shapes of the lens elements included in each of the lens groups; however, the structure of each of the lens groups and the shape of each lens element does not have to be defined as they are. The structure of each of the lens groups and the shape of each lens may be optimized based on desired specifications.

Here, similar to Embodiment 1, the number of the lenses included in the correcting lens group 350 is very important in reducing a shift in the position of the image.

A study by the inventors shows that having two lenses in the correcting lens group 350 is much more effective than having one lens in order to concurrently satisfy three requirements: a smaller set of compound lenses 300; high modulation transfer function (MTF) performance; and reduction in the shift of the image in focusing. In other words, two correcting lenses (the first correcting lens 351 and the second correcting lens 352) provided between the focus lens group 340 and the imaging device (the image plane 370) achieve excellent optical properties.

In the set of compound lenses 300, described next is how to reduce the weight of the focus lens 341 as well as to diminish the distance of a focal point shift caused by a change in ambient temperature.

In the set of compound lenses 300, a focus lens 341 of the focus lens group 340 is made of a plastic material formed in a positive meniscus.

It is noted that an exemplary lens element (positive meniscus lens) described here as the focus lens 341 is formed in a positive meniscus which is convex to the object side; however, the focus lens 341 shall not be defined as it is. The focus lens 341 may be any lens element as far as the lens element has positive optical power. For example, the focus lens 341 may be a biconvex lens or a plana-convex lens.

An exemplary plastic material for the focus lens 341 may be the E48R that is low in coefficient of thermal expansion and stable in mechanical shape. The specific gravity of the E48R is approximately 1.01. This is smaller than a half of 2.52, which is the specific gravity of the BSC7 known as a relatively light-weight glass material. In other words, the plastic lens contributes to significantly reducing the lens weight over the glass lens if the size of the lenses is the same.

The temperature dependency for a refractive index found in such a plastic material is approximately one digit greater than the temperature dependency for a refractive index found in a glass material. This results in an increase in the distance of a focal point shift caused by a change in ambient temperature.

Suppose, as a simple example, a plastic lens is used as the focus lens and the change in temperature is 5° C. The focal point shifts: approximately 6 µm when the focal length is 5 mm; approximately 8 µm when the focal length is 18 mm; and approximately as far as 12 µm when the focal length is 84 mm.

Here, the rise in the ambient temperature causes a rise in the temperature of the focus lens followed by reduction in the refractive index of the focus lens. As a result, the refractive power decreases and the focal point goes far. Consequently, the focal point shifts.

Embodiment 3 shows how to diminish the distance of the focal point shift developed in the focus lens 341, using the first correcting lens 351 that is placed the far object-side of the correcting lens group 350.

Figure 9:
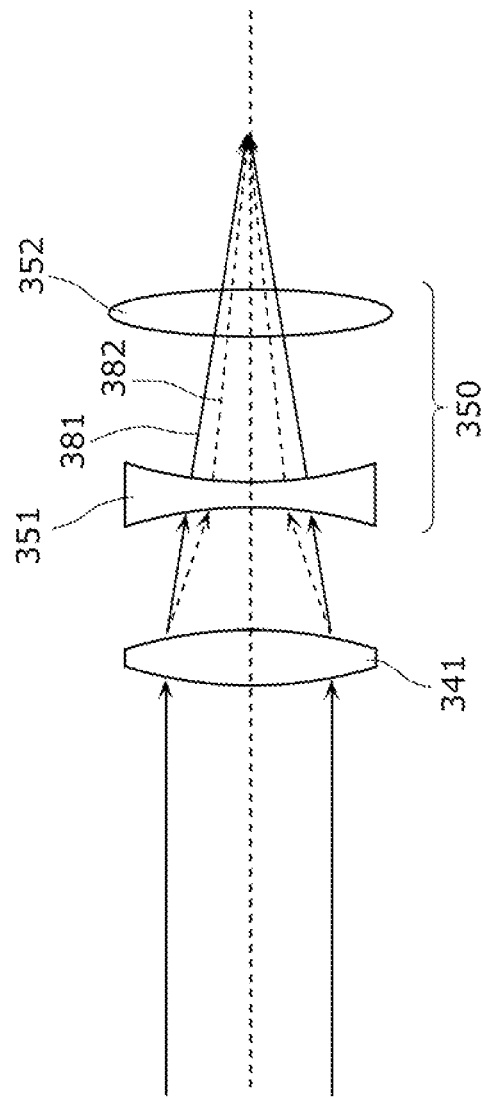
FIG. 9 shows how an image shifts when the set of compound lenses according to Embodiment 3 of the present invention is used.

FIG. 9 illustrates how the first correcting lens 351 is effective in diminishing the distance of the focal point shift. In FIG. 9, the solid lines show the traveling directions of rays under a high temperature, and the broken lines show the traveling directions of rays under a low temperature.

Here the first correcting lens 351 is a plastic lens. The first correcting lens 351 is formed in a biconcave shape for negative optical power which is opposite the optical power (refractive power) of the focus lens 341.

It is noted that the first correcting lens 351 does not have to be formed in the biconcave shape; instead, the first correcting lens 351 may be any lens element as far as the lens element has the negative optical power. The exemplary first correcting lens 351 may include, for example, a negative meniscus lens or a planoconcave lens.

An exemplary material for the first correcting lens 351 may be the E48R that is the same material for the focus lens 341.

Similar to the focus lens 341, the refractive index of the first correcting lens 351 decreases when an ambient temperature rises. Here, however, the first correcting lens 351 is shaped to have the negative optical power. Thus, when the refractive index decreases, a force acts upon the focal point so that, on the contrary, the focal point, which is shifted away by the focus lens 341, is about to be shifted near.

Hence the optical power of the focus lens 341 is set positive and the optical power of the first correcting lens 351 is set negative. Then the both lenses are arranged. Consequently, the variation in the focal point shift is successfully reduced.

A study shows that the plastic material in use does not have to be the E48R; instead, another plastic material, such as polycarbonate, may be used.

Based on the above lens arrangement, a variation in the shift of the focal point is calculated when the change in ambient temperature is 5° C. and the distance to the object is infinity.

The calculation shows that the range of the focal point shifts: approximately 1 µm when the focal length is 5 mm (the illustration (a) in FIG. 8), approximately 1 µm when the focal length is 18 mm (the illustration (b) in FIG. 8), and approximately equal to 1 µm or shorter even when the focal length is 84 mm (the illustration (c) in FIG. 8). Hence, the feature of the Embodiment 3 is found to reduce the range of the focal point shift. In other words, the feature is effective in correcting the focal point under am ambient temperature.

Figure 10A:
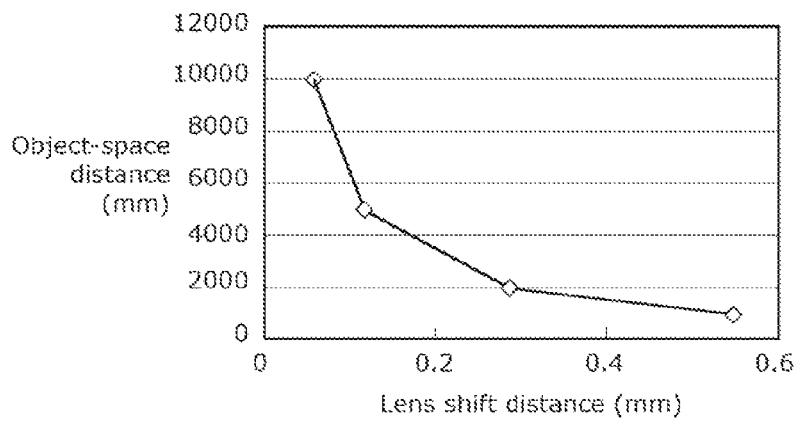
FIG. 10A shows the optical properties of the set of compound lenses according to Embodiment 3 of the present invention.
Figure 10B:
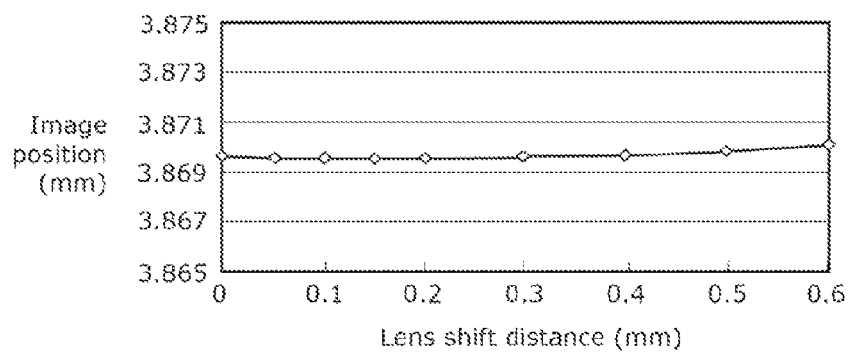
FIG. 10B shows the optical properties of the set of compound lenses according to Embodiment 3 of the present invention.
Figure 10C:
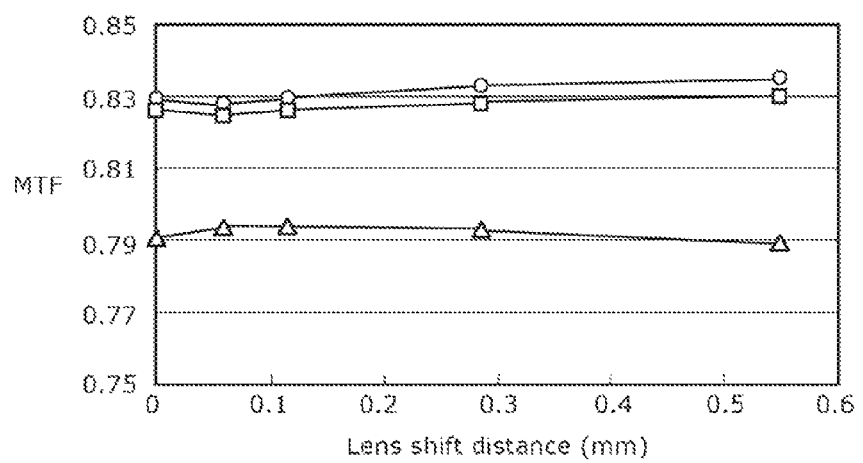
FIG. 10C shows the optical properties of the set of compound lenses according to Embodiment 3 of the present invention.

Each of FIGS. 10A to 10C shows optical properties obtained by a set of compound lenses 300 according to Embodiment 3.

FIG. 10A shows a relationship between a lens shift distance and an object-space distance.

Here the lens shift distance indicates how far the focus lens 341 moves when the object-space distance changes, based on the position of the focus lens 341 in the focus lens group 340 that is in a standard state. In the standard state, the positions of the first lens group 310, the second lens group 320, the third lens group 330, and the focus lens group 340 are set so that, in the set of compound lenses 300 shown in FIG. 8, the image of an object is formed on the image plane 370 with a desired focal length and an object-space distance of infinity.

FIG. 10A depicts a graph with the plotted lens shift distances of the focus lens 341 in the illustration (b) in FIG. 8 when the focal length is 18 mm and the object-space distance changes from 10000 mm to 5000 mm, to 2000 mm, and to 1000 mm. In the graph, the plotted points are connected with straight lines for the sake of convenience. As a matter of course, the actual properties are to be shown in a curve.

As the graph shows, the lens shift distance is greater as the object comes closer to the set of compound lenses 300.

FIG. 10B shows how the image position shifts in association with the shift of the focus lens 341. As seen in FIG. 10B, the shift in the image position is found so small that the shift distance of the image position is decreased as short as 1 μm or shorter.

Here the image position is defined by, for example, the position of the principal ray. This technique is effective when, out of the aberration of the set of compound lenses 300, the amount of spherical aberration is dominant and coma aberration is small. In such a case, the technique makes the designing of a lens easy.

In addition, defining the barycenter of a light-collecting area is effective in accurately defining the image position. This technique makes it possible to obtain a convolved image having little blur even though the coma aberration is dominant on a set of compound lenses.

Described next are MTF characteristics with reference to FIG. 10C. As shown in FIG. 5C, the MTF rarely deteriorates even though the shift distance of the focus lens 341 greatly changes from 0 mm to 0.55 mm.

Furthermore, FIG. 10C shows MFT performance at 50 lp/mm. The circles in the graph show the on-axis MTF performance. The squares in the graph show the MTF performance in a saggital direction (radiation direction) when the image height is seventy percent. The triangles in the graph show the MTF performance in a tangential direction (circumferential direction) when the image height is seventy percent.

According to FIGS. 10B and 10C, the set of compound lenses 300 shows little shift in the image position when the focus lens 341 shifts, and maintains excellent MTF performance.

Hence, the set of compound lenses 300 develops little shift in image position and maintains excellent MTF. This is because when the position of a ray, which enters the focus lens 341, shifts when the focus lens 341 shifts, the correcting lens group 350 can reduce the range of the shift in the position where the ray enters an imaging device (the image plane 370). In other words, the correcting lens group 350 is capable of minimizing the motion in image position developed due to the above-described shift of the focus lens 341.

It is noted that FIGS. 10A to 10C show an exemplary focal length of 18 mm. When the focal lengths are 84 mm and 5 mm, the set of compound lenses 300 still maintains high performance. Hence, even a high-performance zoom lens having the zoom ratio of over 16× and the angle of view of over 38° can implement significantly excellent optical properties, when the lens is used as a small zoom lens for the F-DOF in a wide range from the wide-angle limit to the telephoto limit.

The application of the present invention in the F-DOF has been described in detail; however, the application of the present invention shall not be defined as it is. As a result of a lighter focus lens, the present invention makes it possible to achieve high-speed focusing. Hence the present invention is effective for a camera with high-speed focusing capability.

Embodiment 4

Embodiment 4 of the present invention describes an imaging apparatus including the set of compound lenses 100 according to Embodiment 1.

Figure 11:
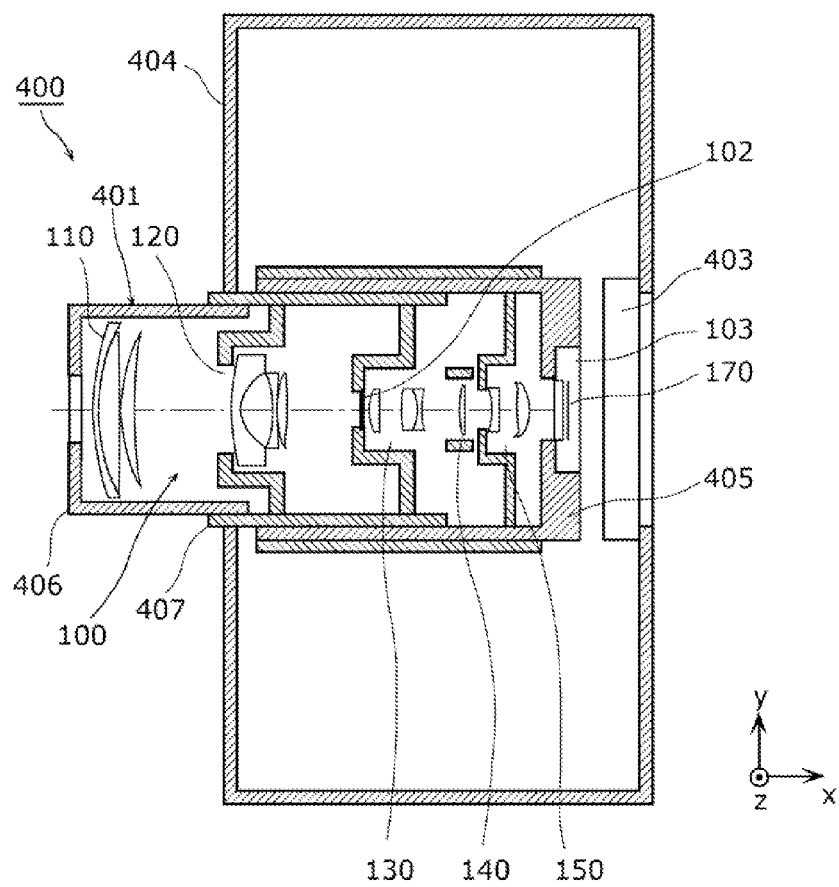
FIG. 11 shows the structure of a digital still camera according to Embodiment 4 of the present invention.

FIG. 11 depicts a schematic view of an imaging apparatus 400 according to Embodiment 4. The imaging apparatus 400 in FIG. 11 is a digital still camera including the set of compound lenses 100, the imaging device 103 that is a complementary metal-oxide semiconductor (CMOS) sensor, a lens barrel 401, a liquid crystal display (LCD) monitor 403, and a chassis 404.

The set of compound lenses 100 is the one described in Embodiment 1. The set of compound lenses 100 in FIG. 11 includes the first lens group 110, the second lens group 120, the aperture 102, the third lens group 130, the focus lens group 140, and the correcting lens group 150.

It is noted that, in FIG. 11, the positive direction of the x-axis is defined as front and the negative direction of the x-axis is defined as back.

The set of compound lenses 100 is provided in the front of the chassis 404, and the imaging device 103 is provided in the back of the set of compound lenses 100. The LCD monitor 403 is provided in the back of the chassis 404. An optical image of the object is formed by the set of compound lenses 100, and the image is projected on the image plane 170.

The lens barrel 401 includes a main lens barrel 405, a moving lens barrel 406, and a cylindrical cam 407. When the cylindrical cam 407 rotates, the first lens group 110, the second lens group 120, the third lens group 130, and the focus lens group 140 move to predetermined positions with respect to the imaging device 103. Hence, the magnification can be varied from the wide-angle limit to the telephoto limit. Furthermore, the focus lens group 140 is an example of the driving unit 190 in FIG. 3. The focus lens group 140 is moved by a not-shown focus adjusting motor in an optical-axis direction (the x-axis direction). The correcting lens group 150 is fixed to the main lens barrel 405.

An exemplary focus adjusting motor is a magnetodynamic actuator such as a voice coil motor (VCM). The use of the VCM makes it possible to achieve a high-speed motion of 30 fpm or faster, which allows video capturing.

The imaging apparatus 400 preferably includes a position sensor, which is not shown in FIG. 11, for detecting the position of the focus lens group 140. The position sensor allows the imaging apparatus 400 to precisely control the moving range and the moving pattern of the focus lens group 140. Here, for example, the position sensor is attached to the lens barrel 401 and detects the position of the focus lens group 140 as an absolute position from the reference point of the lens barrel 401.

Moreover, the position sensor may be provided to the moving lens barrel 406 that holds the focus lens group 140, and measure the position of the focus lens group 140 with respect to a specific reference point of the moving lens barrel 406.

Preferably, the position sensor may be an optical encoder which reads regularly-arranged groove patterns or a magneto-resistive (MR) element which utilizes the magneto-resistive effect that shows a variation in electrical resistance by a magnetic field. Since such a position sensor allows the imaging apparatus 400 to accurately measure the position of the focus lens group 140, the imaging apparatus 400 can easily control the position of the focus lens group 140.

The maximum moving distance of the focus lens group 140 may be changed depending on the scene of capturing and a focal length. For example, the maximum moving distance may be between 0.3 mm and 0.5 mm. A motion of 0.5 mm or longer causes deterioration in S/N of a convolved image, as well as an increase in the power consumption of the VCM. Hence the maximum moving distance may preferably be shorter than 0.5 mm.

Furthermore, from the viewpoints of the S/N and the power consumption of the VCM, the maximum moving distance of the focus lens group 140 may preferably be approximately 0.3 mm or shorter.

Moreover, as for the focus lens group 140, the lighter the more preferable—that is 0.4 g or lighter.

Preferably, the focus lens group 140 may weigh as light as approximately 0.2 g. The weight of a lens may be changed according to the size of an imaging device, an effective aperture, the material of a lens, and the thickness of a lens. In the case of the digital still camera, for example, a single glass lens is used with its thickness appropriately optimized. The focus lens shown in Embodiment 3 successfully weighs as light as approximately 0.2 g.

The Four Thirds camera has a larger imaging device; however, the use of plastic lenses can significantly reduce the camera weight.

When only a single focus lens is used, optical properties such as an aberration property and a shift in image position could deteriorate to some extent, compared with the case where two focus lenses are used. At least one surface of the focus lens is formed in an aspheric surface, so that the optical properties of the lens successfully improve.

Hence the focus lens can shift as fast as 30 fpm or faster, which is advantageous from a practical viewpoint.

Described next is the shift in the position of an image formed on the image plane 170 when the focus lens moves. There is no question that a shorter shift in image position is more preferable. In particular, the image position significantly shifts when an image is captured with the wide-angle limit whose focal length is short or when the object-space distance is short. Hence, the shift in image position is particularly obvious in short-distance photography and macro photography. It is in such cases that the shift in image position should be reduced in particular.

The shift in image position is also particularly obvious when an image in a short distance is captured with the telephoto limit. When the object is far, such as infinity, and near, such as 1000 mm, the focus lens needs to be significantly moved. When the object is as far as 10000 mm and as near as 1000 mm, the focus lens in the set of compound lenses 100 according to Embodiment 1 moves as long as approximately 2.4 mm. It is noted that, in a regular zoom lens, the focus lens would move as long as approximately 3.9 mm. A shorter moving distance means a longer moving distance of the object-space distance with respect to the moving distance per unit length of the focus lens. In other words, a shorter moving distance of the focus lens is more preferable.

Moreover, a shorter shift distance of the image position is more preferable. Preferably, the distance of the image position is equal to one pixel or less in the imaging device 103. When the shift of the image is one pixel or more, the displacement of an image becomes apparent even by the naked eye, which is not preferable.

As a matter of course, after the image is obtained, image processing may be applied for correcting the displacement of the image. Such image processing could reduce the image displacement to some extent. However, less image displacement on the original image is advantageous also for the image processing.

It is noted that at least the correcting lens group successfully achieves the effect of reducing the shift amount of an image position by correcting and reducing a shift in the position of an image formed on an imaging device when the focus lens group moves within a predetermined range.

Here, for the sake of lens designing, the position of the principal ray or the barycenter of a light-collecting area may be used as the image position. In the case of a zoom lens, an off-axis light-collecting area is affected by coma aberration more than an on-axis light-collecting area is. Thus, in the off-axis light-collecting area, displacement is often observed between the position of the principal ray and the barycenter of the light-collecting area. Hence, for an image obtained with the F-DOF, it is the difference of the barycenter of the light-collecting area, rather than the difference of the position of the principal ray, that has a higher relationship with the image position shift. Thus the barycenter of the light-collecting area is preferable for use as the image position.

Preferably, the barycenter of the light-collecting area is calculated for each color of the color filter formed on a pixel of the imaging device to be used. More preferably, a correcting lens is set for each of the pixels so that the barycenter does not shift for each color.

When an RGB primary color filter is used, the correcting lens is set so that the shift of the barycenter decreases for each of R, G, and B. Here, the smaller the shift of the barycenter for each color is, the more preferable it is. Preferably, the shift of the barycenter is one pixel or smaller.

Similar to a regular digital still camera, a smaller chromatic aberration of magnification is definitely preferable as a shorter shift distance of the barycenter for RGB is so.

Hence, the use of the set of compound lenses 100 according to Embodiment 1 for a digital still camera can implement a compact digital still camera, having the FDOF capability, which causes little shift in the position of an image, and drives the focus lens fast with low power consumption.

It is noted that the imaging apparatus 400 may include, as a set of compound lenses, one of the set of compound lenses 200 according to Embodiment 2, the set of compound lenses 300 according to Embodiment 3, and a modification thereof.

Moreover, the optical system for the imaging apparatus 400 shown in FIG. 11 may be used for a digital video camera to capture a moving image. The optical system can capture a moving image having high resolution and a moving image having an extended depth of field, as well as a still image.

Moreover, an imaging apparatus including the set of compound lenses according to Embodiments 1 to 3 and an imaging device such as a CMOS or a CCD may be applied to a monitoring camera for a monitoring system, a webcam, and a vehicle-mounted camera.

Described below are exemplary specific numerical values for the sets of compound lenses according to Embodiments 1 to 3. It is noted that, for each exemplary specific numerical values in the figures, a unit of length is millimeter or "mm", and a unit of angle of view is degree or "°". For each exemplary specific numerical values, "r" represents radius of curvature, "d" represents surface separation, "nd" represents refractive index with respect to the d-line, and "vd" represents Abbe number with respect to the d-line. For each exemplary specific numerical values, a surface denoted by an asterisk or "*" is an aspheric surface. The form of the aspheric surface is defined by the following Math. 1:

[Math. 1]

$$Z = \frac{h^2/r}{1+\sqrt{1-(1+k)(h/r)^2}} + A4h^4 + A6h^6 + A8h^8 + A10h^{10} + A12h^{12}$$

(Expression 1)

Here "k" represents conic constant, "A4", "A6", "A8", "A10", and "A12" respectively represent the aspheric coefficients of the 4th, 6th, 8th, 10th, and 12th.

[Exemplary Specific Numerical Values 1]

The zoom lens system of the exemplary specific numerical values 1 corresponds to the set of compound lenses 100 according to Embodiment 1 shown in FIG. 4. FIGS. 12, 13, and 14 show the details of the zoom lens system of the exemplary specific numerical values 1, FIG. 12 shows the data of spherical lens surfaces. FIG. 13 shows the data of aspheric lens surface. FIG. 14 shows various data.

[Exemplary Specific Numerical Values 2]

The zoom lens system of the exemplary specific numerical values 2 corresponds to the set of compound lenses 200 according to Embodiment 2 shown in FIG. 6. FIGS. 15, 16, and 17 show the details of the zoom lens system of the exemplary specific numerical values 2. FIG. 15 shows the data of spherical lens surfaces. FIG. 16 shows the data of aspheric lens surface. FIG. 17 shows various data.

[Exemplary Specific Numerical Values 3]

The zoom lens system of the exemplary specific numerical values 3 corresponds to the set of compound lenses 300 according to Embodiment 3 shown in FIG. 8. FIGS. 18, 19, and 20 show the details of the zoom lens system of the exemplary specific numerical values 3. FIG. 18 shows the data of spherical lens surfaces. FIG. 19 shows the data of aspheric lens surface. FIG. 20 shows various data.

Although only some exemplary embodiments of this invention have been described in detail above, the present invention shall not be defined as they are.

For example, the present invention may be a combination of at least a part of functions of (i) the set of compound lenses and the imaging apparatuses according to the embodiments and (ii) the modifications of the set of compound lenses and the imaging apparatuses.

All the numbers used in the embodiments are exemplary ones to specifically describe the present invention. Hence the present invention shall not be limited by these exemplary numbers. All the materials for the constituent elements described above are exemplary ones to specifically describe the present invention. Hence the present invention shall not be limited by these exemplary materials. The connecting relations between the constituent elements are exemplary ones to specifically describe the present invention. Hence the exemplary connecting relations to achieve the present invention shall not be limited as they are.

Those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to a set of compound lenses and an imaging apparatus. In addition, the present invention is useful for a household or professional-use imaging apparatus (digital still camera).

REFERENCE SIGNS LIST 100, 200, 300, 500, and 600 Set of compound lenses
101, 501, and 601 Magnification changing lens group
102, 202, 302, 502, and 602 Aperture
103, 503, and 603 Imaging device
110, 210, and 310 First lens group
111, 211, and 311 First lens element
112, 212, and 312 Second lens element
113, 213, and 313 Third lens element
120, 220, and 320 Second lens group
121, 221, and 321 Fourth lens element
122, 222, and 322 Fifth lens element
123, 223, and 323 Sixth lens element
130 and 330 Third lens group
131 and 331 Seventh lens element
132 and 332 Eighth lens element
133 and 333 Ninth lens element
140, 240, 340, 540, and 640 Focus lens group
141, 241, and 341 Focus lens
150, 250, and 350 Correcting lens group
151, 251, and 351 First correcting lens
152, 252, and 352 Second correcting lens
160, 260, and 360 Parallel plate
170, 270, and 370 Image plane
190 Driving unit
400 Imaging apparatus
401 Lens barrel
403 LCD monitor
404 Chassis
405 Main lens barrel
406 Shifting lens barrel
407 Cylindrical cam

The invention claimed is:

1. A set of compound lenses which configured to form, on an imaging device, an optical image of an object, the set of compound lenses comprising:
   a focus lens unit;
   a driving unit configured to shift a range of focus by moving the focus lens unit within a predetermined range during an exposure period; and
   a correcting lens unit configured to correct a shift in a position of an image formed on the imaging device to one pixel or less, the shift occurring when the focus lens unit moves within the predetermined range.

2. The set of compound lenses according to claim 1, wherein the position of the image formed on the imaging device is a barycenter of a light collecting area.

3. The set of compound lenses according to claim 2, wherein the barycenter of the light collecting area is a barycenter of each of color filters formed above a light detecting unit of the imaging device.

4. The set of compound lenses according to claim 1, wherein the correcting lens unit includes correcting lenses.

5. The set of compound lenses according to claim 1, wherein the correcting lens unit is fixed.

6. The set of compound lenses according to claim 1, wherein the focus lens unit includes only one lens.

7. The set of compound lenses according to claim 1, wherein the correcting lens unit is provided closer to the imaging device than the focus lens unit is.

8. The set of compound lenses according to claim 1, wherein the set of compound lenses has a zoom function.

9. The set of compound lenses according to claim 1, wherein the focus lens unit has positive optical power, and includes a focus lens which is made of plastic resin and has positive optical power, and
the correcting lens unit has positive optical power, and includes a first correcting lens which is made of plastic resin and has negative optical power.

10. The set of compound lenses according to claim 9, wherein the focus lens is a positive meniscus lens.

11. The set of compound lenses according to claim 9, wherein the first correcting lens is a negative meniscus lens.

12. The set of compound lenses according to claim 1, wherein the driving unit is a magnetodynamic actuator.

13. An imaging apparatus comprising:
the set of compound lenses according to claim 1; and
the imaging device, which converts the optical image formed by the set of compound lenses into an electrical image signal.

* * * * *